US010604703B2

(12) United States Patent
Wittek et al.

(10) Patent No.: US 10,604,703 B2
(45) Date of Patent: Mar. 31, 2020

(54) LIQUID CRYSTAL MEDIUM AND LIQUID CRYSTAL DISPLAY

(71) Applicant: MERCK PATENT GMBH, Darmstadt (DE)

(72) Inventors: Michael Wittek, Erzhausen (DE); Mathias Bremer, Darmstadt (DE); Edward Plummer, Darmstadt (DE); Mila Fischer, Muehltal (DE); Harald Lannert, Fraenkisch-Crumbach (DE); Volker Meyer, Rossdorf (DE)

(73) Assignee: MERCK PATENT GMBH, Darmstadt (DE)

( * ) Notice: Subject to any disclaimer, the term of this patent is extended or adjusted under 35 U.S.C. 154(b) by 89 days.

(21) Appl. No.: 15/749,386

(22) PCT Filed: Jul. 12, 2016

(86) PCT No.: PCT/EP2016/001200
§ 371 (c)(1),
(2) Date: Jan. 31, 2018

(87) PCT Pub. No.: WO2017/020989
PCT Pub. Date: Feb. 9, 2017

(65) Prior Publication Data
US 2018/0223189 A1   Aug. 9, 2018

(30) Foreign Application Priority Data

Jul. 31, 2015   (EP) .................................... 15002273

(51) Int. Cl.
| G02F 1/00 | (2006.01) |
| C09K 19/54 | (2006.01) |
| C09K 19/02 | (2006.01) |
| C09K 19/20 | (2006.01) |
| C09K 19/12 | (2006.01) |
| C09K 19/34 | (2006.01) |
| C09K 19/04 | (2006.01) |

(52) U.S. Cl.
CPC .......... C09K 19/54 (2013.01); C09K 19/0275 (2013.01); C09K 19/12 (2013.01); C09K 19/20 (2013.01); C09K 19/34 (2013.01); G02F 1/00 (2013.01); C09K 2019/0448 (2013.01); C09K 2019/0466 (2013.01); C09K 2019/123 (2013.01); C09K 2019/3422 (2013.01); C09K 2019/548 (2013.01)

(58) Field of Classification Search
CPC ..................................................... C09K 19/20
See application file for complete search history.

(56) References Cited

U.S. PATENT DOCUMENTS

| 8,551,359 B2 | 10/2013 | Jansen |
| 8,659,737 B2 | 2/2014 | Wittek |
| 2014/0097384 A1 | 4/2014 | Wittek |

FOREIGN PATENT DOCUMENTS

| EP | 2377909 A1 | 10/2011 |
| EP | 2568032 A2 | 3/2013 |
| JP | 8005994 A | 1/1996 |
| JP | HP H08-5994 A * | 1/1996 |
| WO | 2012163470 A1 | 12/2012 |

OTHER PUBLICATIONS

Farzana Ahmad et al. "Study of polymer dispersed liquid crystal film based on amphiphilic polymer matrix", Arabian Journal of Chemistry, Feb. 4, 2014 ( Feb. 4, 2014), XP055318525, SA ISSN: 1878-5352, DOI: 10.1016/j.arabjc.2014.01.022 (Year: 2014).*
International Search Report PCT/EP2016/001200 dated Nov. 21, 2016.
Farzana Ahmad et al: "Study of polymer dispersed liquid crystal film based on amphiphilic polymer matrix", Arabian Journal of Chemistry, Feb. 4, 2014 (Feb. 4, 2014), SA, XP055318525, ISSN: 1878-5352.

* cited by examiner

*Primary Examiner* — Chanceity N Robinson
(74) *Attorney, Agent, or Firm* — Millen White Zelano and Branigan, PC; Csaba Henter

(57) ABSTRACT

The present invention relates to mesogenic media and to electro-optical displays comprising these media as light modulation media. In particular, the electro-optical displays according to the present invention are displays, which are operated at a temperature, at which the mesogenic modulation media are in an optically isotropic phase, preferably in a blue phase.

17 Claims, No Drawings

LIQUID CRYSTAL MEDIUM AND LIQUID CRYSTAL DISPLAY

FIELD OF THE INVENTION

The present invention relates to mesogenic media and to electro-optical displays comprising these media as light modulation media. In particular the electro-optical displays according to the present invention are displays, which are operated at a temperature, at which the mesogenic modulation media are in an optically isotropic phase, preferably in a blue phase.

Problem to be Solved and State of the Art

Electro-optical displays and mesogenic light modulation media, which are in the isotropic phase when being operated in the display are described in DE 102 17 273 A. Electro-optical displays, and mesogenic light modulation media, which are in the optically isotropic blue phase, when being operated in the display are described in WO 2004/046 805.

U.S. Pat. No. 7,070,838 describes polymerisable compounds containing a 2-di- or trifluoromethyl-1,4-phenyl ring, and the use thereof in polymerisable mixtures, LC polymers and LC displays having a cholesteric phase and in optical films. Specific compounds of a formula 1a-2-19 having the following structure are also disclosed therein:

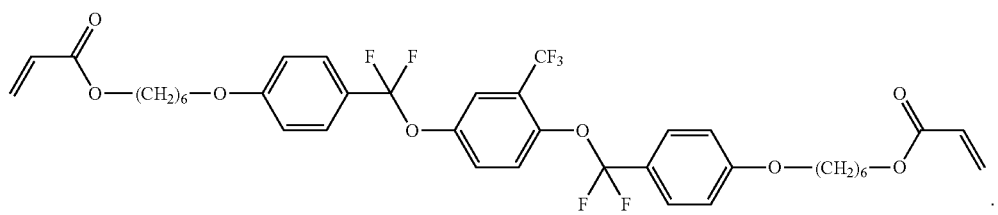

However, no properties of this compound on use in an LC display are disclosed. In addition, the use of such compounds for the stabilisation of blue phases or in PSA displays is neither described in nor is obvious from U.S. Pat. No. 7,070,838.

JP 2005-015473 A discloses polymerisable compounds containing unsaturated spacer groups (alkynylene or alkenylene). Specific compounds of the formulae 1-13-77 to 1-13-84, 1-13-134, 1-13-135, 1-56-9, 1-56-10, 1-56-23, 1-56-24 which contain phenyl rings linked via $CF_2O$ bridges are also disclosed therein, as is the use thereof for the production of optically anisotropic films and in ferroelectric LC media. Specific compounds, for example having the following structures, are also disclosed therein.

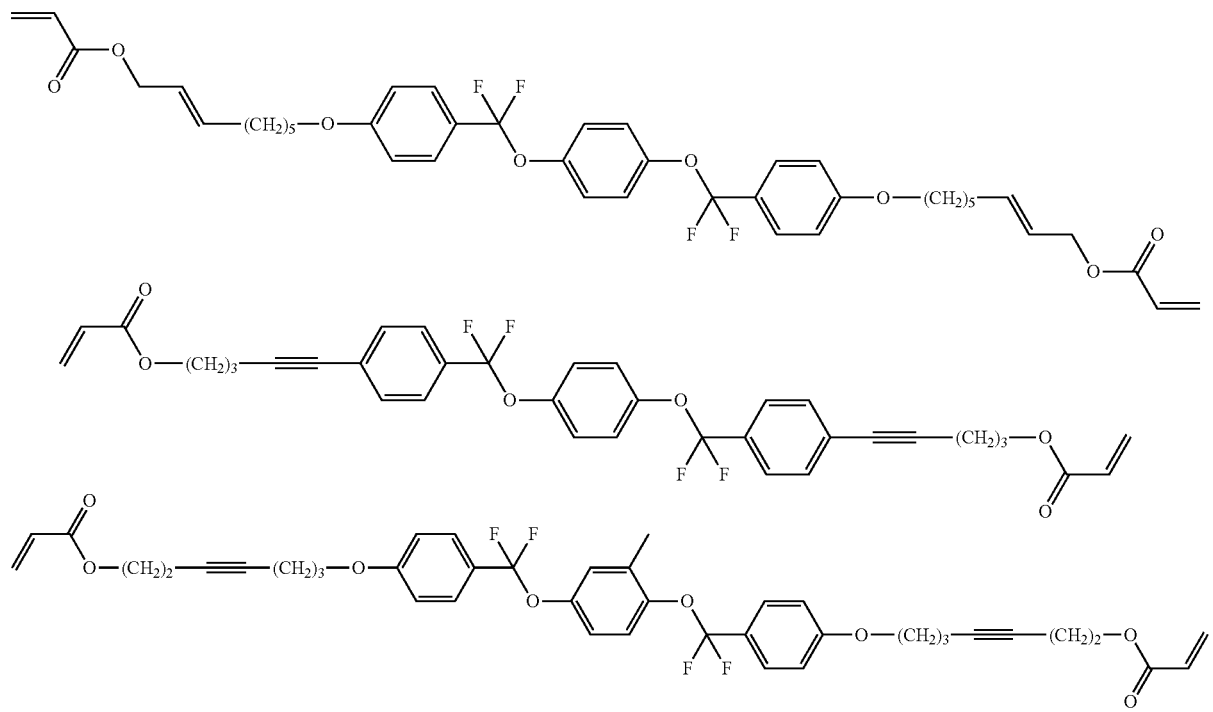

However, the use of such compounds for the stabilisation of blue phases or in PSA displays is neither described in nor is obvious from JP 2005-015473 A.

The specifications US 2009/0268143 and US 2010/0078593 claim difluorooxymethylene-bridged polymerisable compounds containing a ring system having negative dielectric anisotropy as a component in liquid-crystal mixtures for anisotropic films.

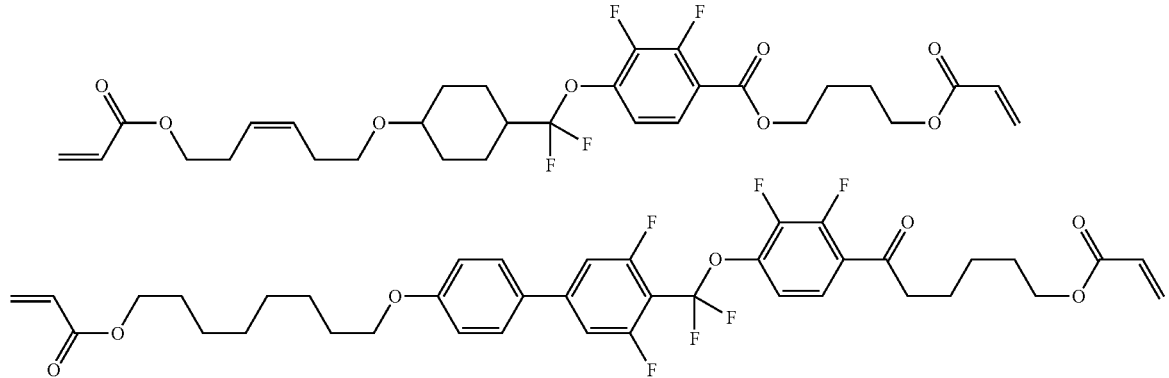

However, no properties of these compounds on use in an LC display are disclosed. In addition, the use of such compounds for the stabilisation of blue phases or in PSA displays is neither described in nor is obvious from these specifications.

WO 2012/163470 A1 discloses a liquid crystalline medium exhibiting a Blue Phase, which is optionally stabilized by a polymerisable component comprising the following formula,

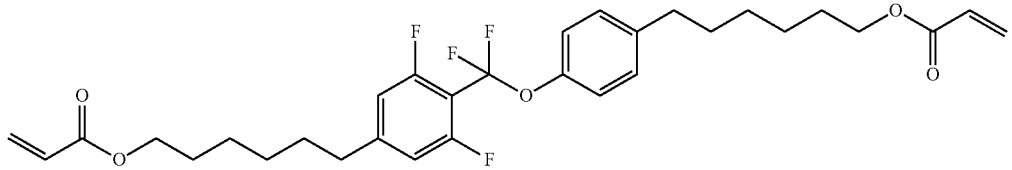 [SMILES: C=CC(=O)OCCCCCCc1ccc(OC(F)(F)c2c(F)cc(CCCCCCOC(=O)C=C)cc2F)cc1]

However, the operational voltage is still unfavourably high.

The mesogenic media and displays described in these references provide several significant advantages compared to well-known and widely used displays using liquid crystals in the nematic phase, like for example liquid crystal displays (LCDs) operating in the twisted nematic (TN)-, the super twisted nematic (STN)-, the electrically controlled birefringence (ECB)-mode with its various modifications and the in-plane switching (IPS)-mode. Amongst these advantages are most pronounced their much faster switching times, and significantly wider optical viewing angle.

Whereas, compared to displays using mesogenic media in another liquid crystalline phase, as e.g. in the smectic phase in surface stabilized ferroelectric liquid crystal displays (SSF LCDs), the displays of DE 102 17 273.0 and WO 2004/046 805 are much easier to manufacture.

For example, they do not require a very thin cell gap and in addition, the electro-optical effect is not very sensitive to small variations of the cell gap.

However, the liquid crystal media described in these patent applications mentioned still require operating voltages, which are not low enough for some applications. Further, the operating voltages of these media vary with temperature, and it is generally observed, that at a certain temperature the voltage dramatically increases with increasing temperature. This limits the applicability of liquid crystal media in the blue phase for display applications. A further disadvantage of the liquid crystal media described in these patent applications is their moderate reliability that is insufficient for very demanding applications. This moderate reliability may be for example expressed in terms of the voltage holding ratio (VHR) parameter, which in liquid crystal media as described above may be below 90%.

Some compounds and compositions have been reported which possess a blue phase between the cholesteric phase and the isotropic phase and can usually be observed by optical microscopy. These compounds or compositions for which the blue phases are observed are typically single mesogenic compounds or mixtures showing a high chirality. However, generally the blue phases observed only extend over a very small temperature range, which is typically less than 1 degree centigrade wide, and/or the blue phase is located at rather inconvenient temperatures.

In order to operate the novel fast switching display mode of WO 2004/046 805 the light modulation medium to be used has to be in the blue phase over a broad range of temperatures encompassing ambient temperature, however. Thus, a light modulation medium possessing a blue phase, which is as wide as possible and conveniently located is required.

For use in a display application, the temperature range of typical materials, which are exhibiting a pure blue phase (BP) on their own, generally is not wide enough. Such materials typically have a blue phase, which extends over a small temperature range of only some degrees, e.g. about 3 to 4° C. Thus, an additional stabilisation, extending the temperature range of the blue phase, is needed in order to make such material suitable for practical applications such as in displays.

Therefore there is a strong need for a modulation medium exhibiting a blue phase with a wide phase range, which may be achieved either by an appropriate mixture of mesogenic compounds themselves or, preferably by mixing a host mixture with appropriate mesogenic properties with a single dopant or a mixture of dopants that stabilises the blue phase over a wide temperature range.

Summarizing, there is a need for liquid crystal media, which can be operated in liquid crystal displays, which are operated at temperatures where the media is in the blue phase, which provide the following technical improvements:
a reduced operating voltage,
a reduced temperature dependency of the operating voltage and
an improved reliability, e.g. VHR.

PRESENT INVENTION

Surprisingly, it now has been found that polymer stabilized mesogenic media comprising one or more compounds selected from the group of compounds of formula A

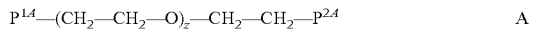
    A wherein
$P^{1,A}$ and $P^{2,A}$ each, independently of one another, denote a polymerisable group, preferably an acrylate, methacrylate, fluoroacrylate, oxetane, vinyloxy- or epoxy group, more preferably an acrylate or methacrylate group, and
z denotes an integer between 1 and 12, preferably an integer between 1 and 8, more preferably an integer between 1 and 5,
allow to realize media which do not exhibit the above mentioned disadvantages of the prior art materials, or even if so, to a lesser extent.

Further preferred compounds of formula A are selected from the following compounds

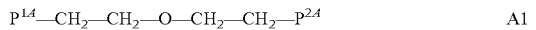
    A1

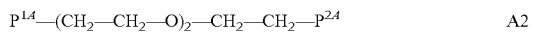
    A2

    A3

    A4

    A5 wherein
$P^{1,A}$ and $P^{2,A}$ each, independently of one another, denote an acrylate or methacrylate group.

The compounds of formula A are accessible by the usual methods known to the expert. Starting materials may be, e.g., compounds of the following types, which are either commercially available or accessible by published methods:

The concentration of the compounds of formula A contained in the media according to the present invention preferably is in the range from 1% or more to 10% or less, more preferably in the range from 2% or more to 9% or less, and most preferably in the range from 4% or more to 8% or less.

In order to stabilise the blue phase by the formation of a polymer, the formulated blue phase host mixture is conveniently combined with an appropriate chiral dopant (one or more suitable chiral compounds) and with one or more reactive compounds as described above and below. The resultant mixture is filled into the LC cell respectively display panel. The LC cell/panel is then held at a certain temperature at which the mixture is in the blue phase, e.g. it is heated or cooled until blue phase can be observed at a certain temperature. This temperature is maintained during the whole polymerisation process. The polymerisation process is typically controlled by UV irradiation of a typical medium-pressure mercury-vapour lamp. A standard condition is e.g. use of 3 mW/cm² for 180 sec. at a wavelength of 380 nm. To avoid damage to the LC material appropriate optical filters can be used additionally.

In the following the criteria for stability of the obtained polymer stabilised blue phase (BP) are briefly be explained.

Ensuring an excellent quality of the polymer stabilisation is critical for use of PS-BP in a display application. The quality of polymer stabilization is the judged by several criteria. Optical inspection ensures a good polymerisation. Any defect and/or haziness observed in the test cell/panel is an indication of a suboptimal polymer stabilisation. Electro-optical inspection under various load/stress conditions ensures long-time stability of the PS-BP. A typical display parameter is the so-called memory effect (ME). The memory effect is defined as the ratio of the contrast ratio for switching on and of the contrast ratio for switching off as a normalized measure of the residual transmission after one or more switching cycles have been executed. A value for this memory effect of 1.0 is an indicator of an excellent polymer stabilisation. A value for this memory effect of more than 1.1 indicates insufficient stabilisation of the blue phase.

For the production of polymer stabilised displays according to the present invention, the polymerisable compounds are polymerised or crosslinked, in case one compound contains or more compounds contain two or more polymerisable groups, by in-situ polymerisation in the LC medium between the substrates of the LC display with application of a voltage. The polymerisation can be carried out in one step. It is also possible firstly to carry out the polymerisation with application of a voltage in a first step in order to generate a pretilt angle, and subsequently, in a second polymerisation step without an applied voltage, to polymerise or crosslink the compounds which have not reacted in the first step ("end curing").

Suitable and preferred polymerisation methods are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184, Irgacure907®, Irgacure369® or Darocure1173® (Ciba AG). If an initiator is employed, its proportion is preferably 0.001 to 5% by weight, particularly preferably 0.001 to 1% by weight.

The polymerisable compounds according to the invention are also suitable for polymerisation without an initiator, which is accompanied by considerable advantages, such as, for example, lower material costs and in particular less contamination of the LC medium by possible residual amounts of the initiator or degradation products thereof. The polymerisation can thus also be carried out without the addition of an initiator. In a preferred embodiment, the LC medium thus comprises no polymerisation initiator.

The polymerisable component or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerisable component, is preferably in the range from 10 to 10,000 ppm, particularly preferably in the range from 50 to 500 ppm.

The polymerisable compounds of formula A can be polymerised individually, but it is also possible to polymerise mixtures which comprise two or more polymerisable compounds according to the invention, or mixtures comprising one or more polymerisable compounds according to the invention and one or more further polymerisable compounds (comonomers).

Suitable polymerisable compounds or co-monomers are mesogenic or non-mesogenic, preferably mesogenic or liquid-crystalline.

Further preferred co-monomers for use in polymer precursors for polymer stabilised displays according to the invention are selected, for example, from the following formulae:

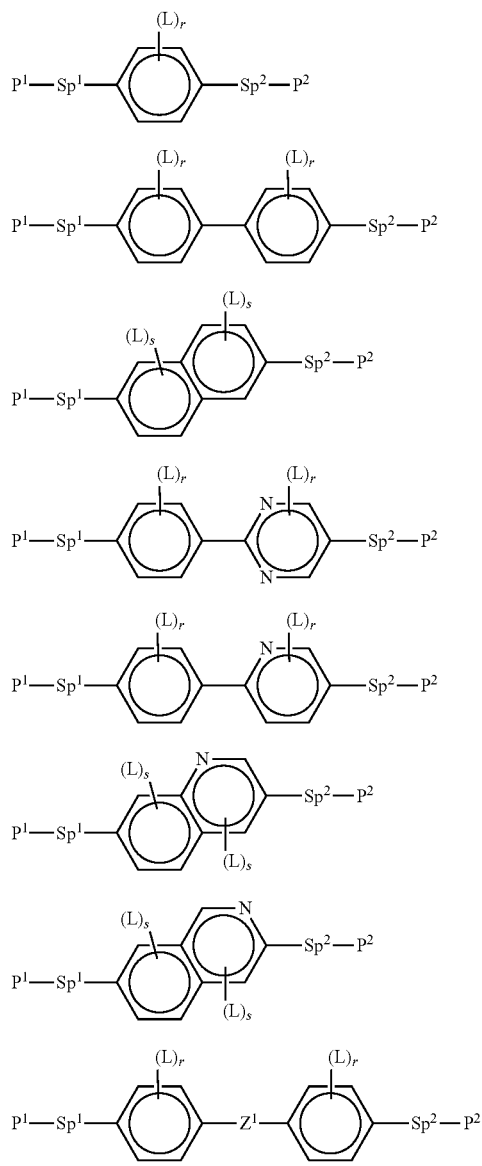

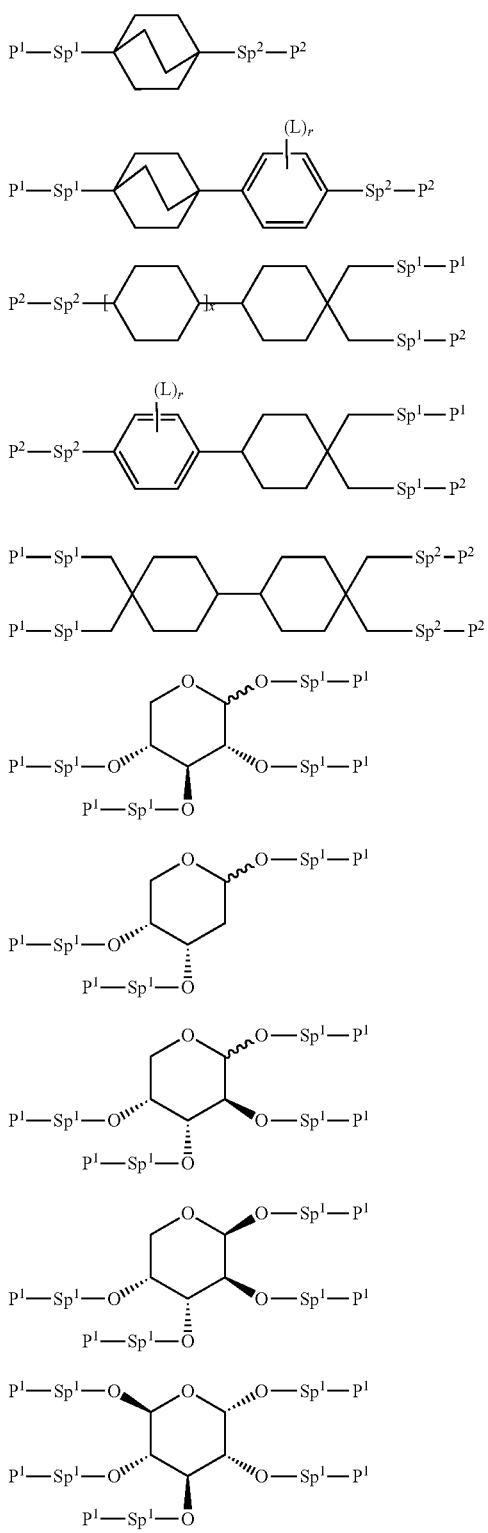

—(CH$_2$)$_{p1}$—, —(CH$_2$)$_{p1}$—O—, —(CH$_2$)$_{p1}$—CO—O— or —(CH$_2$)$_{p1}$—O—CO—O—, wherein p1 is an integer from 1 to 12, and wherein the groups mentioned last are linked to the adjacent ring via the O-atom, and, wherein alternatively also one or more of P$^1$—Sp$^1$- and P$^2$-Sp$^2$- may be R$^{aa}$, provided that at least one of P$^1$-Sp$^1$- and P$^2$-Sp$^2$- present in the compound is not R$^{aa}$, R$^{aa}$ H, F, Cl, CN or linear or branched alkyl having 1 to 25 C-atoms, wherein one or more non-adjacent —CH$_2$— groups, independently of each another, may be replaced by)) —C(R$^0$)=C(R$^{00}$—, —C≡C—, —N(R$^0$)—, —O—, —S—, —CO—, —CO—O—, —O—CO—, —O—CO—O— in such a way that neither O- nor S-atoms are directly linked to one another, and wherein also one or more H-atoms may be replaced by F, Cl, CN or P$^1$-Sp$^1$-, particularly preferred linear or branched, optionally single- or polyfluorinated, alkyl, alkoxy, alkenyl, alkinyl, alkylcarbonyl, alkoxycarbonyl, or alkylcarbonyloxy having 1 to 12 C-atoms, wherein the alkenyl- and alkinyl groups have at least two and the branched groups have at least three C-atoms, R$^0$, R$^{00}$ each, at each occurrence independently of one another, H or alkyl having 1 to 12 C-atoms, R$^Y$ and R$^Z$ each, independently of one another, H, F, CH$_3$ or CF$_3$, Z$^1$ —O—, —CO—, —C(R$^Y$R$^Z$)—, or —CF$_2$CF$_2$—, Z$^2$ and Z$^3$ each, independently of one another, —CO—O—, —O—CO—, —CH$_2$O—, —OCH$_2$—, —CF$_2$O—, —OCF$_2$—, or —(CH$_2$)$_n$—, wherein n is 2, 3 or 4, L at each occurrence independently of one another, F, Cl, CN, SCN, SF$_5$ or linear or branched, optionally mono- or polyfluorinated, alkyl, alkoxy, alkenyl, alkinyl, alkylcarbonyl, alkoxycarbonyl, alkylcarbonyloxy or alkoxycarbonyloxy having 1 to 12 C-atoms, preferably F, L' and L" each, independently of one another, H, F or Cl, r 0, 1, 2, 3 or 4, s 0, 1, 2 or 3, t 0, 1 or 2, and x 0 or 1.

Preferred mono-reactive compounds are the compounds of formulae M1 to M29, wherein one or more of P$^1$-Sp$^1$- and P$^2$-Sp$^2$- are R$^{aa}$, such that the compounds have a single reactive group only.

Further preferred mono-reactive compounds are the compounds of the following formulae

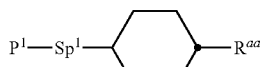

M16-A

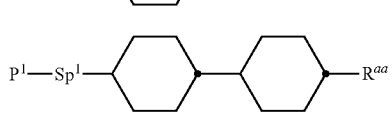

M17-A wherein P$^1$, Sp$^1$ and R$^{aa}$ have the respective meanings given above.

Particularly preferred mono-reactive compounds are the compounds of the following formulae wherein the parameters have the following meanings:

P$^1$ and P$^2$ each, independently of one another, a polymerisable group, preferably an acrylate, methacrylate, fluoroacrylate, oxetane, vinyloxy- or epoxy group, Sp$^1$ and Sp$^2$ each, independently of one another, a single bond or a spacer group, particularly preferred

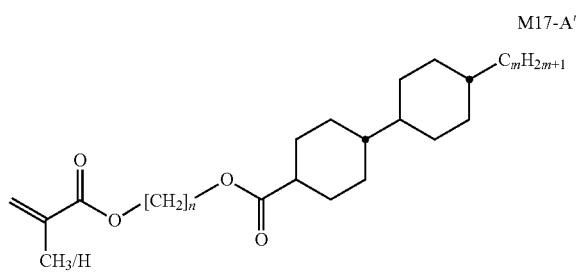

M17-A' wherein
n is an integer, preferably an even integer, in the range from 1 to 16, preferably from 2 to 8,
m is an integer in the range from 1 to 15, preferably from 2 to 7,
are especially preferred.

The compounds of formulae M1 to M29 are accessible by the usual methods known to the expert. Starting materials may be, e.g., compounds of the following types, which are either commercially available or accessible by published methods:

The concentration of the compounds of formula M contained in the media according to the present invention preferably is in the range from 1% or more to 10% or less, more preferably in the range from 2% or more to 9% or less, and most preferably in the range from 4% or more to 8% or less.

In a preferred embodiment of the present invention the media according to the present invention additionally comprise one or more compounds of formulae I and II,

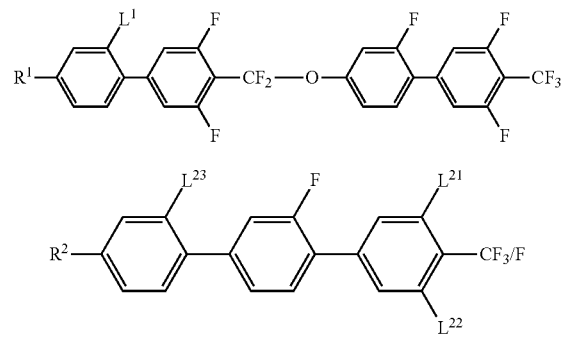

I

II wherein
$L^1$ is H or F, preferably F,
$L^{21}$ to $L^{23}$ are, independently of each other, H or F, preferably $L^{21}$ and $L^{22}$ are both F and/or $L^{23}$ is F,
$R^1$ and $R^2$ are, independently of each other, alkyl, which is straight chain or branched, preferably has 1 to 20 C-atoms, is unsubstituted, mono- or poly-substituted by F, Cl or CN, preferably by F, and in which one or more CH$_2$ groups are optionally replaced, in each case independently from one another, by —O—, —S—, —NR$^{01}$—, —SiR$^{01}$R$^{02}$—, —CO—, —COO—, —OCO—, —OCO—O—, —S—CO—, —CO—S—, —CY$^{01}$=CY$^{02}$— or —C≡C— in such a manner that O and/or S atoms are not linked directly to one another, preferably n-alkyl, n-alkoxy with 1 to 9 C-atoms, preferably 2 to 5 C-atoms, alkenyl, alkenyloxy or alkoxyalkyl with 2 to 9 C-atoms, preferably with 2 to 5 C-atoms or halogenated alkyl, halogenated alkenyl or halogenated alkoxy, preferably mono fluorinated, di-fluorinated or oligofluorinated alkyl, alkenyl or alkoxy, most preferably n-alkyl, n-alkoxy, alkenyl, alkenyloxy or alkoxyalkyl,
$Y^{01}$ and $Y^{02}$ are, independently of each other, F, Cl or CN, and alternatively one of them may be H,
$R^{01}$ and $R^{02}$ are, independently of each other, H or alkyl with 1 to 12 C-atoms, In a preferred embodiment of the present invention the media according to the present invention additionally comprise one or more compounds of formula III

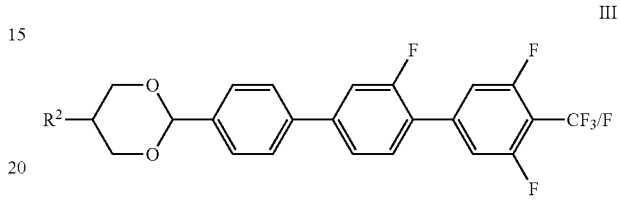

III wherein
$R^3$ has one of the meanings given for $R^1$ under formula I above.

Preferably, the media according to the present invention additionally comprise one or more compounds selected from the group of compounds of formulae IV and V

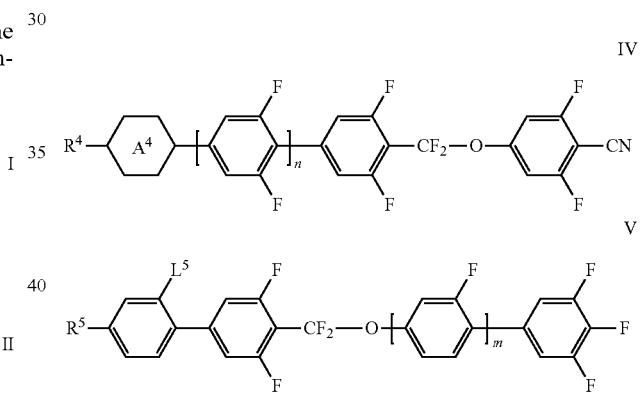

IV

V wherein
$R^4$ and $R^5$ are, independently of each other, alkyl, which is straight chain or branched, preferably has 1 to 20 C-atoms, is unsubstituted, mono- or poly-substituted by F, Cl or CN, preferably by F, and in which one or more CH$_2$ groups are optionally replaced, in each case independently from one another, by —O—, —S—, —CO—, —COO—, —OCO—, —OCO—O—, —S—CO—, —CO—S— or —C≡C— in such a manner that O and/or S atoms are not linked directly to one another, preferably n-alkyl, n-alkoxy with 1 to 9 C-atoms, preferably 2 to 5 C-atoms, alkenyl, alkenyloxy or alkoxyalkyl with 2 to 9 C-atoms, preferably with 2 to 5 C-atoms, most preferably n-alkyl, n-alkoxy, alkenyl, alkenyloxy or alkoxyalkyl,
$L^5$ is H or F, preferably F,

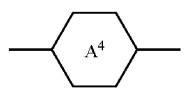

is

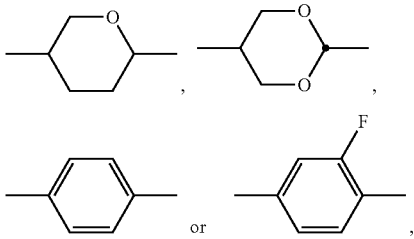

preferably

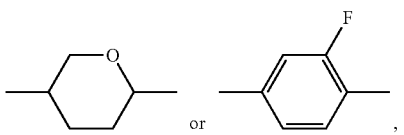

and n and m are, independently of one another, 0 or 1, preferably m is 1.

In a preferred embodiment of the present invention the mesogenic media comprise one or more compounds of formula I, preferably selected from the group of compounds of its sub-formulae I-1 and I-2, preferably of formula I-2,

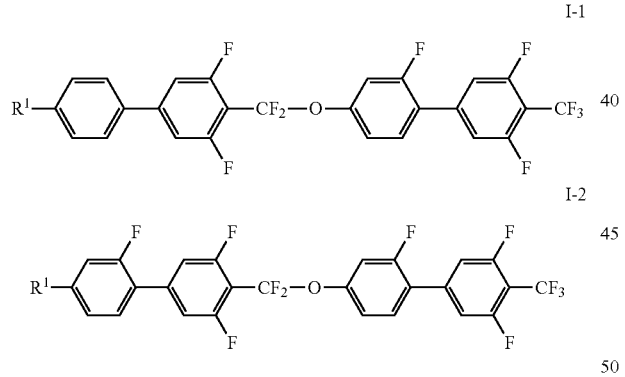

wherein $R^1$ has the meaning given under formula I above and preferably is n-alkyl, most preferably ethyl, n-propyl, n-butyl, n-pentyl or n-hexyl.

In a preferred embodiment of the present invention the mesogenic media comprise one or more compounds of formula III, preferably a compound wherein $R^2$ has the meaning given under formula III above and more preferably is n-alkyl, more preferably ethyl, n-propyl, n-butyl, n-pentyl or n-hexyl and, most preferably n-butyl.

In a preferred embodiment of the present invention the mesogenic media comprise one or more compounds of formula II, preferably selected from the group of compounds of its sub-formulae II-1 to II-8, preferably of formula II-1 to II-4, most preferably of formula II-3,

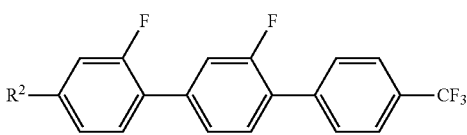

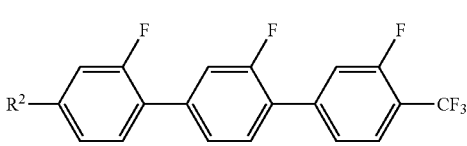

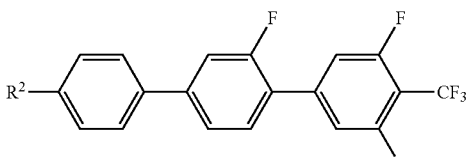

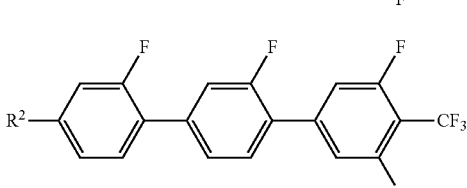

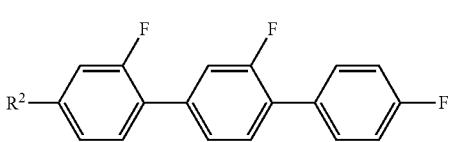

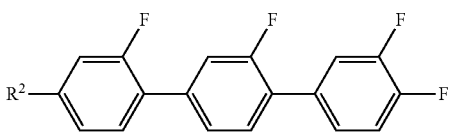

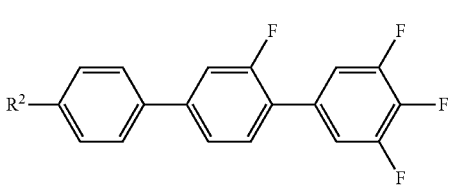

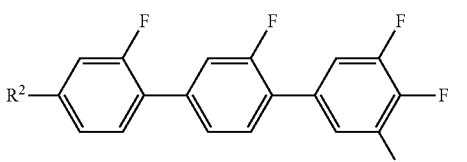

wherein $R^2$ has the meaning given under formula II above and preferably is n-butyl or n-pentyl.

In a preferred embodiment of the present invention the mesogenic media comprise one or more compounds of formula IV, preferably selected from the group of compounds of its sub-formulae IV-1 to IV-4, preferably of formula IV-2,

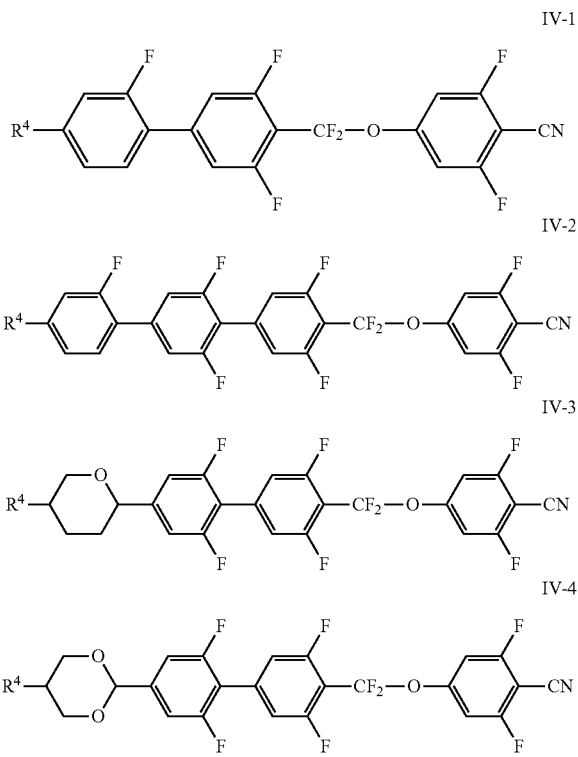

IV-1
IV-2
IV-3
IV-4 wherein R⁴ has the meaning given under formula IV above.

In a preferred embodiment of the present invention the mesogenic media comprise one or more compounds of formula V, preferably selected from the group of compounds of its sub-formulae V-1 and V-2, preferably one or more compounds of formula V-1 and one or more compounds of formula V-2,

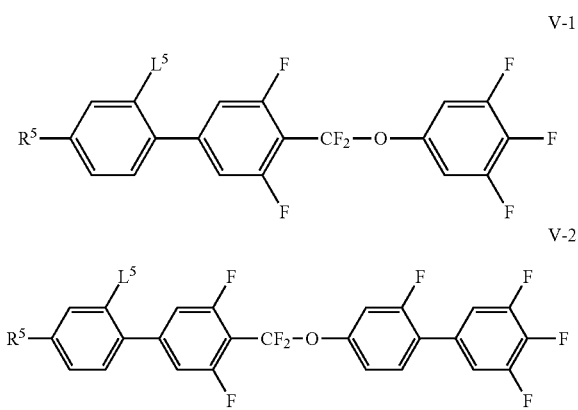

V-1
V-2 wherein R⁵ has the meaning given under formula V above.

An alkyl or an alkoxy radical, i.e. an alkyl where the terminal $CH_2$ group is replaced by —O—, according to this invention may be straight-chain or branched. It is preferably straight-chain, has 1, 2, 3, 4, 5, 6, 7 or 8 carbon atoms and accordingly is preferably methyl, ethyl, propyl, butyl, pentyl, hexyl, heptyl, octyl, ethoxy, propoxy, butoxy, pentoxy, hexoxy, heptoxy, or octoxy, furthermore nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. an alkyl group in which one non-terminal $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkenyl group, i.e. an alkyl group wherein one or more $CH_2$ groups are replaced by —CH=CH—, may be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C-atoms are generally preferred.

In an alkyl group, wherein one $CH_2$ group is replaced by —O— and one by —CO—, these radicals are preferably neighboured. Accordingly these radicals together form a carbonyloxy group —CO—O— or an oxycarbonyl group —O—CO—. Preferably such an alkyl group is straight-chain and has 2 to 6 C atoms.

It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl, 4-(methoxycarbonyl)-butyl.

An alkyl group wherein two or more $CH_2$ groups are replaced by —O— and/or —COO—, it can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis(methoxycarbonyl)-methyl, 2,2-bis-(methoxycarbonyl)-ethyl, 3,3-bis(methoxycarbonyl)-propyl, 4,4-bis-(methoxycarbonyl)-butyl, 5,5-bis(methoxycarbonyl)-pentyl, 6,6-bis-(methoxycarbonyl)-hexyl, 7,7-bis(methoxycarbonyl)-heptyl, 8,8-bis-(methoxycarbonyl)-octyl, bis(ethoxycarbonyl)-methyl, 2,2-bis-(ethoxycarbonyl)-ethyl, 3,3-bis(ethoxycarbonyl)-propyl, 4,4-bis-(ethoxycarbonyl)-butyl, 5,5-bis(ethoxycarbonyl)-hexyl.

An alkyl or alkenyl group that is monosubstituted by CN or $CF_3$ is preferably straight-chain. The substitution by CN or $CF_3$ can be in any desired position.

An alkyl or alkenyl group that is at least monosubstituted by halogen is preferably straight-chain. Halogen is preferably F or Cl, in case of multiple substitutions preferably F. The resulting groups include also perfluorinated groups. In case of monosubstitution the F or Cl substituent can be in any desired position, but is preferably in ω-position. Examples for especially preferred straight-chain groups with a terminal F substituent are fluoromethyl, 2-fluoroethyl, 3-fluoropropyl, 4-fluorobutyl, 5-fluoropentyl, 6-fluorohexyl and 7-fluoroheptyl. Other positions of F are, however, not excluded.

Halogen means F, Cl, Br and I and is preferably F or Cl, most preferably F. Each of $R^1$, $R^5$, R, R' and R" may be a polar or a non-polar group. In case of a polar group, it is preferably selected from CN, $SF_5$, halogen, $OCH_3$, SCN, $COR^5$, $COOR^5$ or a mono- oligo- or polyfluorinated alkyl or alkoxy group with 1 to 4 C atoms. $R^5$ is optionally fluorinated alkyl with 1 to 4, preferably 1 to 3 C atoms. Especially preferred polar groups are selected of F, Cl, CN, $OCH_3$, $COCH_3$, $COC_2H_5$, $COOCH_3$, $COOC_2H_5$, $CF_3$, $CHF_2$, $CH_2F$, $OCF_3$, $OCHF_2$, $OCH_2F$, $C_2F_5$ and $OC_2F_5$, in particular F, Cl, CN, $CF_3$, $OCHF_2$ and $OCF_3$. In case of a non-polar group, it is preferably alkyl with up to 15 C atoms or alkoxy with 2 to 15 C atoms.

Each of $R^1$ to $R^5$ may be an achiral or a chiral group. In case of a chiral group it is preferably of formula I*:

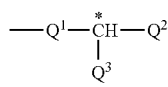

wherein
$Q^1$ is an alkylene or alkylene-oxy group with 1 to 9 C atoms or a single bond,
$Q^2$ is an alkyl or alkoxy group with 1 to 10 C atoms which may be unsubstituted, mono- or polysubstituted by F, Cl, Br or CN, it being also possible for one or more non-adjacent $CH_2$ groups to be replaced, in each case independently from one another, by —C≡C—, —O—, —S—, —NH—, —N($CH_3$)—, —CO—, —COO—, —OCO—, —OCO—O—, —S—CO— or —CO—S— in such a manner that oxygen atoms are not linked directly to one another,
$Q^3$ is F, Cl, Br, CN or an alkyl or alkoxy group as defined for $Q^2$ but being different from $Q^2$.

In case $Q^1$ in formula I* is an alkylene-oxy group, the O atom is preferably adjacent to the chiral C atom.

Preferred chiral groups of formula I* are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups I* are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

In addition, compounds containing an achiral branched alkyl group may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

The compounds of formulae I to V are accessible by the usual methods known to the expert. Starting materials may be, e.g., compounds of the following types, which are either commercially available or accessible by published methods:

The concentration of the compounds of formula I or II contained in the media according to the present invention preferably is in the range from 0.5% or more to 70% or less, more preferably in the range from 1% or more to 60% or less and most preferably in the range from 5% or more to 50% or less.

Suitable chiral compounds utilized in the media according to the present invention are those, which have an absolute value of the helical twisting power of 20 $\mu m^{-1}$ or more, preferably of 40 $\mu m^{-1}$ or more and most preferably of 60 $\mu m^{-1}$ or more. The HTP is measured in the liquid crystalline medium MLC-6260 at a temperature of 20° C.

The mesogenic media according to the present invention comprise preferably one or more chiral compounds, which have a mesogenic structure and exhibit preferably one or more mesophases themselves, particularly at least one cholesteric phase. Preferred chiral compounds being comprised in the mesogenic media are, amongst others, well known chiral dopants like cholesteryl-nonanoate (CN), R/S-811, R/S-1011, R/S-2011, R/S-3011, R/S-4011, R/S-5011, CB-15 (Merck KGaA, Darmstadt, Germany). Preferred are chiral dopants having one or more chiral moieties and one or more mesogenic groups or having one or more aromatic or alicyclic moieties forming, together with the chiral moiety, a mesogenic group. More preferred are chiral moieties and mesogenic chiral compounds disclosed in DE 34 25 503, DE 35 34 777, DE 35 34 778, DE 35 34 779, DE 35 34 780, DE 43 42 280, EP 01 038 941 and DE 195 41 820 that disclosure is incorporated herein by way of reference. Particular preference is given to chiral binaphthyl derivatives as disclosed in EP 01 111 954.2, chiral binaphthol derivatives as disclosed in WO 02/34739, chiral TADDOL derivatives as disclosed in WO 02/06265 as well as chiral dopants having at least one fluorinated linker and one end chiral moiety or one central chiral moiety as disclosed in WO 02/06196 and WO 02/06195.

The concentration of the chiral compounds, which are contained in the media according to the present invention preferably, is in the range from 1% or more to 20% or less, more preferably in the range from 2% or more to 10% or less and most preferably in the range from 3% or more to 7% or less.

In a preferred embodiment the mesogenic modulation media according to the instant invention comprise
one compound or more compounds selected from the group of compounds of formulae I and II,
optionally, preferably obligatorily, one or more compounds selected from the group of compounds of formulae IV and V of one or more chiral compounds with a HTP of ≥20 µm$^{-1}$,
one or more compounds of formula A, and
optionally, one or more compounds of formulae M1 to M29.

The inventive mixtures preferably comprise one or more compounds selected from the group of compounds of formulae I and II and optionally III, preferably in a total concentration in the range from 40% or more to 80% or less, preferably from 45% or more to 75% or less and most preferably from 50% or more to 70% or less.

In particular, the inventive mixtures preferably comprise one or more compounds of formula I in a total concentration in the range from 40% or more to 80% or less, preferably from 45% or more to 75% or less and most preferably from 50% or more to 70% or less.

In case the inventive mixtures comprise one or more compounds formula II, the total concentration of these compounds preferably is in the range from 1% or more to 15% or less, preferably from 2% or more to 10% or less and most preferably from 4% or more to 8% or less.

In case the inventive mixtures comprise one or more compounds formula III, the total concentration of these compounds preferably is in the range from 1% or more to 20% or less, preferably from 2% or more to 15% or less and most preferably from 3% or more to 10% or less.

In case the inventive mixtures comprise one or more compounds formula IV the total concentration of these compounds preferably is in the range from 1% or more to 15% or less, preferably from 2% or more to 10% or less and, most preferably, from 4% or more to 8% or less.

In case the inventive mixtures comprise one or more compounds formula V the total concentration of these compounds preferably is in the range from 5% or more to 45% or less, preferably from 15% or more to 40% or less and most preferably from 25% or more to 35% or less.

The mesogenic medium of the present invention has a characteristic temperature, preferably a clearing point, in the range from about −30° C. to about 90° C., especially up to about 70° C. or even 80° C.

The inventive mixtures preferably contain one ore more (two, three, four or more) chiral compounds in the range of 1-25 wt. %, preferably 2-20 wt. %, each. Especially preferred are mixtures containing 3-15 wt.-% total of one or more chiral compounds.

Preferred embodiments are indicated below:
The medium comprises one, two, three, four or more compounds of formula I, preferably of formula I-2, and/or
the medium comprises one, two or more compounds of formula II, preferably of formula II-3, and/or
the medium comprises one or more compounds of formula III and/or
the medium comprises one, two or more compounds of formula IV, preferably of formula IV-2, and/or
the medium comprises one, two, three or more compounds of formula V, and/or
the medium comprises one, two, three or more chiral compounds, preferably having a helical twisting power of 20 µm$^{-1}$ or more, and/or
the medium comprises one, two or more reactive compounds, preferably one, two or more reactive mesogenic compounds, preferably of formulae P, preferably of one or more of its sub-formulae, and/or one or more reactive mesogenic compounds selected from the group of formulae M1 to M29, preferably of formulae M16-A and/or M17-A, more preferably of formula M17-A' and the medium comprises one, two or more reactive compounds, preferably one, two or more reactive mesogenic compounds, preferably of formulae A, preferably of one or more of its sub-formulae A1 to A5.

It has been found that even a relatively small proportion of compounds of the formula A mixed with compounds of formulae M1 to M29 upon polymerisation, are able to, and preferably do stabilize the phase range of the blue phase and/or decrease the temperature dependence of the electro-optical effect.

Furthermore, it has been found that even a relatively small proportion of compounds of the formula I mixed with conventional liquid-crystal materials, but in particular with one or more compounds of the formulae II and III, leads to a lower operating voltage and a broader operating temperature range. Preference is given, in particular, to mixtures, which, besides one or more compounds of the formula I, comprise one or more compounds of the formula III, in particular compounds of the formula III in which $R^3$ is n-butyl.

The compounds of the formulae I to V are colourless, stable and readily miscible with one another and with other liquid-crystalline materials. The optimum mixing ratio of the compounds of the formulae I and II and III depends substantially on the desired properties, on the choice of the components of the formulae I, II and/or III, and on the choice of any other components that may be present. Suitable mixing ratios within the range given above can easily be determined from case to case.

The total amount of compounds of the formulae I and II and optionally III in the mixtures according to the invention is in many cases not crucial. The mixtures can therefore comprise one or more further components for the purposes of optimisation of various properties. However, the observed effect on the operating voltage and the operating temperature range is generally greater, the higher the total concentration of compounds of the formulae I and II and optionally III.

In a particularly preferred embodiment, the media according to the invention comprise one or more compounds each of the formulae I and II and optionally III. A favourable synergistic effect with the compounds of the formula I results in particularly advantageous properties. In particular, mixtures comprising compounds of formula I and of formula II and/or of formula III are distinguished by their low operating voltages.

The individual compounds of the formulae I, II to III, IV and V, which can be used in the media according to the invention, are either known or can be prepared analogously to the known compounds.

The construction of the MLC display according to the invention from polarisers, electrode base plates and surface-treated electrodes corresponds to the conventional construction for displays of this type. The term conventional construction is broadly drawn here and also covers all derivatives and modifications of the MLC display, in particular including matrix display elements based on poly-Si TFT or MIM, however, particularly preferred are displays, which have electrodes on just one of the substrates, i.e. so called inter-digital electrodes, as those used in IPS displays, preferably in one of the established structures.

A significant difference between the displays according to the invention and the conventional displays based on the twisted nematic cell consists, however, in the choice of the liquid-crystal parameters of the liquid-crystal layer.

The media according to the invention are prepared in a manner conventional per se. In general, the components are dissolved in one another, advantageously at elevated temperature. By means of suitable additives, the liquid-crystalline phases in accordance with the invention can be modified in such a way that they can be used in all types of liquid crystal display elements that have been disclosed hitherto. Additives of this type are known to the person skilled in the art and are described in detail in the literature (H. Kelker and R. Hatz, Handbook of Liquid Crystals, Verlag Chemie, Weinheim, 1980). For example, pleochroic dyes can be added for the preparation of coloured guest-host systems or substances can be added in order to modify the dielectric anisotropy, the viscosity and/or the alignment of the nematic phases. Furthermore, stabilisers and antioxidants can be added.

The mixtures according to the invention are suitable for TN, STN, ECB and IPS applications and isotropic switching mode (ISM) applications. Hence, there use in an electro-optical device and an electro-optical device containing liquid crystal media comprising at least one compound according to the invention are subject matters of the present invention.

The inventive mixtures are highly suitable for devices, which operate in an optically isotropic state. The mixtures of the invention are surprisingly found to be highly suitable for the respective use.

Electro-optical devices that are operated or operable in an optically isotropic state recently have become of interest with respect to video, TV, and multi-media applications. This is, because conventional liquid crystal displays utilizing electro-optical effects based on the physical properties of liquid crystals exhibit a rather high switching time, which is undesired for said applications. Furthermore most of the conventional displays show a significant viewing angle dependence of contrast that in turn makes necessary measures to compensate this undesired property.

With regard to devices utilizing electro-optical effects in an isotropic state the German Patent Application DE 102 17 273 A1 for example discloses light-controlling (light modulation) elements in which the mesogenic controlling medium for modulation is in the isotropic phase at the operating temperature. These light controlling elements have a very short switching time and a good viewing angle dependence of contrast. However, the driving or operating voltages of said elements are very often unsuitably high for some applications.

German Patent Application DE 102 41 301 yet unpublished describes specific structures of electrodes allowing a significant reduction of the driving voltages. However, these electrodes make the process of manufacturing the light controlling elements more complicated.

Furthermore, the light controlling elements, for example, disclosed in both DE 102 17 273 A1 and DE 102 41 301 show significant temperature dependence. The electro-optical effect that can be induced by the electrical field in the controlling medium being in an optical isotropic state is most pronounced at temperatures close to the clearing point of the controlling medium. In this range the light controlling elements have the lowest values of their characteristic voltages and, thus, require the lowest operating voltages. As temperature increases, the characteristic voltages and hence the operating voltages increase remarkably. Typical values of the temperature dependence are in the range from about a few volts per centigrade up to about ten or more volts per centigrade. While DE 102 41 301 describes various structures of electrodes for devices operable or operated in the isotropic state, DE 102 17 273 A1 discloses isotropic media of varying composition that are useful in light controlling elements operable or operated in the isotropic state. The relative temperature dependence of the threshold voltage in these light controlling elements is at a temperature of 1 centigrade above the clearing point in the range of about 50%/centigrade. That temperature dependence decreases with increasing temperature so that it is at a temperature of 5 centigrade above the clearing point of about 10%/centigrade. However, for many practical applications of displays utilizing said light controlling elements the temperature dependence of the electro-optical effect is too high. To the contrary, for practical uses it is desired that the operating voltages are independent from the operating temperature over a temperature range of at least some centi-grades, preferably of about 5 centi-grades or more, even more preferably of about 10 centi-grades or more and especially of about 20 centi-grades or more.

Now it has been found that the use of the inventive mixtures are highly suitable as controlling media in the light controlling elements as described above and in DE 102 17 273 A1, DE 102 41 301 and DE 102 536 06 and broaden the temperature range in which the operating voltages of said electro-optical operates. In this case the optical isotropic state or the blue phase is almost completely or completely independent from the operating temperature.

This effect is even more distinct if the mesogenic controlling media exhibit at least one so-called "blue phase" as described in yet unpublished WO 2004/046 805. Liquid crystals having an extremely high chiral twist may have one or more optically isotropic phases. If they have a respective cholesteric pitch, these phases might appear bluish in a cell having a sufficiently large cell gap. Those phases are therefore also called "blue phases" (Gray and Goodby, "Smectic Liquid Crystals, Textures and Structures", Leonhard Hill, USA, Canada (1984)). Effects of electrical fields on liquid crystals existing in a blue phase are described for instance in H. S. Kitzerow, "The Effect of Electric Fields on Blue Phases", Mol. Cryst. Liq. Cryst. (1991), Vol. 202, p. 51-83, as well as the three types of blue phases identified so far, namely BP I, BP II, and BP III, that may be observed in field-free liquid crystals. It is noteworthy, that if the liquid crystal exhibiting a blue phase or blue phases is subjected to an electrical field, further blue phases or other phases different from the blue phases I, II and III might appear.

The inventive mixtures can be used in an electro-optical light-controlling element which comprises
one or more, especially two substrates;
an assembly of electrodes;
one or more elements for polarizing the light; and
said controlling medium;
whereby said light-controlling element is operated (or operable) at a temperature at which the controlling medium is in an optically isotropic phase when it is in a non-driven state.

The controlling medium of the present invention has a characteristic temperature, preferably a clearing point, in the range from about −30° C. to about 90° C., especially up to about 70° C. to 80° C.

The operating temperature of the light controlling elements is preferably above the characteristic temperature of the controlling medium said temperature being usually the transition temperature of the controlling medium to the blue phase; generally the operating temperature is in the range of about 0.1° to about 50°, preferably in the range of about 0.1° to about 10° above said characteristic temperature. It is highly preferred that the operating temperature is in the range from the transition temperature of the controlling medium to the blue phase up to the transition temperature of the controlling medium to the isotropic phase which is the clearing point. The light controlling elements, however, may also be operated at temperatures at which the controlling medium is in the isotropic phase.

(For the purposes of the present invention the term "characteristic temperature" is defined as follows:

If the characteristic voltage as a function of temperature has a minimum, the temperature at this minimum is denoted as characteristic temperature.

If the characteristic voltage as a function of temperature has no minimum and if the controlling medium has one or more blue phases, the transition temperature to the blue phase is denoted as characteristic temperature; in case there are more than one blue phase, the lowest transition temperature to a blue phase is denoted as characteristic temperature.

If the characteristic voltage as a function of temperature has no minimum, and if the controlling medium has no blue phase, the transition temperature to the isotropic phase is denoted as characteristic temperature.

In the context of the present invention the term "alkyl" means, as long as it is not defined in a different manner elsewhere in this description or in the claims, straight-chain and branched hydrocarbon (aliphatic) radicals with 1 to 15 carbon atoms. The hydrocarbon radicals may be unsubstituted or substituted with one or more substituents being independently selected from the group consisting of F, Cl, Br, I or CN.

The dielectrics may also comprise further additives known to the person skilled in the art and described in the literature. For example, 0 to 5% of pleochroic dyes, antioxidants or stabilizers can be added.

C denotes a crystalline phase, S a smectic phase, $S_C$ a smectic C phase, N a nematic phase, I the isotropic phase and BP the blue phase.

$V_x$ denotes the voltage for X % transmission. Thus e.g. $V_{10}$ denotes the voltage for 10% transmission and $V_{100}$ denotes the voltage for 100% transmission (viewing angle perpendicular to the plate surface). $t_{on}$ (respectively $\tau_{on}$) denotes the switch-on time and $t_{off}$ (respectively $\tau_{off}$) the switch-off time at an operating voltage corresponding to the value of $V_{100}$, respectively of $V_{max}$.

An denotes the optical anisotropy. Δε denotes the dielectric anisotropy ($\Delta\varepsilon=\varepsilon_\parallel-\varepsilon_\perp$, where $\varepsilon_\parallel$ denotes the dielectric constant parallel to the longitudinal molecular axis and $\varepsilon_\perp$ denotes the dielectric constant perpendicular thereto). The electro-optical data are measured in a TN cell at the $1^{St}$ minimum of transmission (i.e. at a (d·Δn) value of 0.5 μm) at 20° C., unless expressly stated otherwise. The optical data are measured at 20° C., unless expressly stated otherwise.

Optionally, the light modulation media according to the present invention can comprise further liquid crystal compounds in order to adjust the physical properties. Such compounds are known to the expert. Their concentration in the media according to the instant invention is preferably 0% to 30%, more preferably 0% to 20% and most preferably 5% to 15%.

Preferably inventive media have a range of the blue phase or, in case of the occurrence of more than one blue phase, a combined range of the blue phases, with a width of 20° or more, preferably of 40° or more, more preferably of 50° or more and most preferably of 60° or more.

In a preferred embodiment this phase range is at least from 10° C. to 30° C., more preferably at least from 10° C. to 40° C. and most preferably at least from 0° C. to 50° C., wherein at least means, that preferably the phase extends to temperatures below the lower limit and at the same time, that it extends to temperatures above the upper limit.

In another preferred embodiment this phase range is at least from 20° C. to 40° C., more preferably at least from 30° C. to 80° C. and most preferably at least from 30° C. to 90° C. This embodiment is particularly suited for displays with a strong backlight, dissipating energy and thus heating the display.

In the present application the term dielectrically positive compounds describes compounds with Δε>1.5, dielectrically neutral compounds are compounds with −1.5≤Δε≤1.5 and dielectrically negative compounds are compounds with Δε<−1.5. The same holds for components. Δε is determined at 1 kHz and 20° C. The dielectric anisotropies of the compounds is determined from the results of a solution of 10% of the individual compounds in a nematic host mixture. The capacities of these test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest and are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$, also called Freedericksz-threshold $V_{Fr}$) is only used if explicitly mentioned.

The ranges of parameters given in this application are all including the limiting values, unless explicitly stated otherwise.

Herein, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm. The dielectric anisotropy (Δε) is determined at a frequency of 1 kHz. The threshold voltages, as well as all other electro-optical properties have been determined with test cells prepared at Merck KGaA, Germany. The test cells for the determination of Δε had a cell gap of 22 μm. The electrode was a circular ITO electrode with an area of 1.13 cm² and a guard ring. The orientation layers were lecithin for homeotropic orientation ($\varepsilon_\parallel$) and polyimide AL-1054 from Japan Synthetic Rubber for homogeneous orientation ($\varepsilon_\perp$). The capacities were determined with a frequency response analyser Solatron 1260 using a sine wave with a voltage of 0.3 or 0.1 $V_{rms}$. The light used in the electro-optical measurements was white light. The set up used was a commercially available equipment of Otsuka, Japan. The characteristic voltages have been determined under perpendicular observation. The threshold voltage ($V_{10}$), mid-grey voltage ($V_{50}$) and saturation voltage ($V_{90}$) have been determined for 10%, 50% and 90% relative contrast, respectively.

The mesogenic modulation material has been filled into an electro optical test cell prepared at the respective facility of Merck KGaA. The test cells had inter-digital electrodes on one substrate side. The electrode width was 10 μm, the distance between adjacent electrodes was 10 μm and the cell gap was also 10 μm. This test cell has been evaluated electro-optically between crossed polarisers.

At low temperatures, the filled cells showed the typical texture of a chiral nematic mixture, with an optical transmission between crossed polarisers without applied voltage. Upon heating, at a first temperature ($T_1$) the mixtures turned optically isotropic, being dark between the crossed polarisers. This indicated the transition from the chiral nematic phase to the blue phase at that temperature. Up to a second temperature ($T_2$) the cell showed an electro-optical effect under applied voltage, typically of some tens of volts, a certain voltage in that range leading to a maximum of the optical transmission. Typically at a higher temperature the voltage needed for a visible electro-optical effect increased strongly, indicating the transition from the blue phase to the isotropic phase at this second temperature ($T_2$).

The temperature range (ΔT(BP)), where the mixture can be used electro-optically in the blue phase most beneficially has been identified as ranging from $T_1$ to $T_2$. This temperature range (ΔT(BP)) is the temperature range given in the examples of this application. The electro-optical displays can also be operated at temperatures beyond this range, i.e. at temperatures above $T_2$, albeit only at significantly increased operation voltages.

The liquid crystal media according to the present invention can contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1 to 3%. The concentration of these and of similar additives is herein not taken into consideration for the values and ranges of the concentrations of the liquid crystal components and compounds of the liquid crystal media.

The inventive liquid crystal media according to the present invention consist of several compounds, preferably of 3 to 30, more preferably of 5 to 20 and most preferably of 6 to 14 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e. g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-, VAN-AMD and in particular in composite systems, like PDLD-, NCAP- and PN-LCDs and especially in HPDLCs.

The melting point: T(K,N), T(K,S) or T(K,I), respectively, the transition temperature from one smectic phase ($S_X$) to another smectic phase ($S_Y$): T($S_X$,$S_Y$), the transition temperature from the smectic (S) to the nematic (N) phase: T(S,N), the clearing point: T (N,I), and the glass transition temperature: $T_g$ of the liquid crystals, as applicable, as well as any other temperature throughout this application, are given in degrees centi-grade (i.e. Celsius).

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

| Code | Structure |
|---|---|
| C | cyclohexane ring |
| P | 1,4-phenylene ring |
| D | 1,3-dioxane ring (with O at 1,3 positions) |
| DI | 1,3-dioxane ring (inverted orientation) |
| A | tetrahydropyran ring |
| AI | tetrahydropyran ring (inverted orientation) |
| G | 2-fluoro-1,4-phenylene |
| GI | 3-fluoro-1,4-phenylene |
| U | 2,3-difluoro-1,4-phenylene |

TABLE A-continued
Ring elements
| | |
|---|---|
| UI | 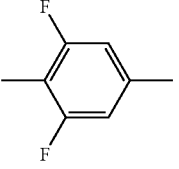 |
| Y | 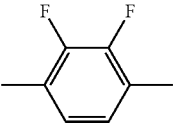 |
| M | 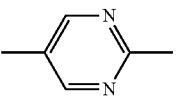 |
| MI | 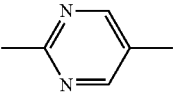 |
| N | 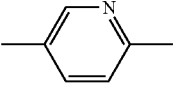 |
| NI | 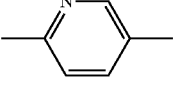 |
| Np | 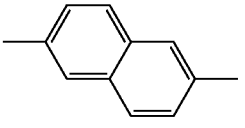 |
| dH | 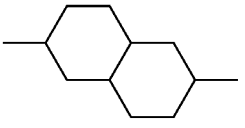 |
| N3f | 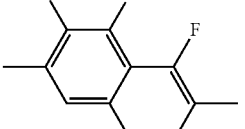 |
| N3fI | 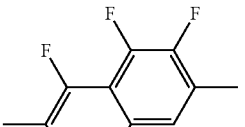 |
| tH | 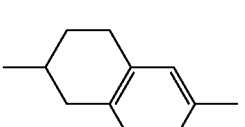 |
| tHI | 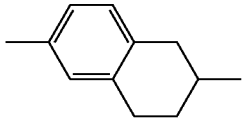 |
| tH2f | 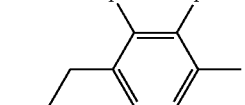 |
| tH2fI | 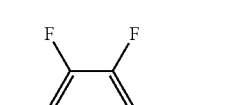 |
| K | 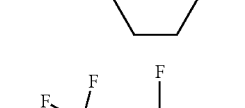 |
| KI | 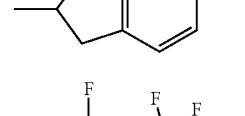 |
| L | 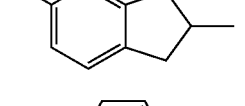 |
| LI | 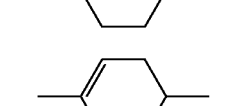 |
| F | 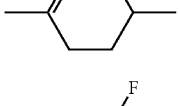 |
| FI | 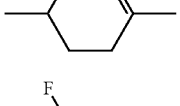 |
TABLE B
Linking groups
| | | | |
|---|---|---|---|
| E | —CH$_2$CH$_2$— | Z | —CO—O— |
| V | —CH═CH— | ZI | —O—CO— |
| X | —CF═CH— | O | —CH$_2$—O— |
| XI | —CH═CF— | OI | —O—CH$_2$— |
| B | —CF═CF— | Q | —CF$_2$—O— |
| T | —C≡C— | QI | —O—CF$_2$— |
| W | —CF$_2$CF$_2$— | T | —C≡C— |

TABLE C

| End groups | | | |
|---|---|---|---|
| Left-hand side | | Right-hand side | |
| Use alone | | | |
| -n- | $C_nH_{2n+1}$— | -n | —$C_nH_{2n+1}$ |
| -nO— | $C_nH_{2n+1}$—O— | -nO | —O—$C_nH_{2n+1}$ |
| —V— | $CH_2$=CH— | —V | —CH=$CH_2$ |
| -nV— | $C_nH_{2n+1}$—CH=CH— | -nV | —$C_nH_{2n}$—CH=$CH_2$ |
| —Vn- | $CH_2$=CH—$C_nH_{2n+1}$— | —Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —CL— | Cl— | —CL | —Cl |
| —M— | $CFH_2$— | —M | —$CFH_2$ |
| —D— | $CF_2H$— | —D | —$CF_2H$ |
| —T— | $CF_3$— | —T | —$CF_3$ |
| —MO— | $CFH_2O$— | —OM | —$OCFH_2$ |
| —DO— | $CF_2HO$— | —OD | —$OCF_2H$ |
| —TO— | $CF_3O$— | —OT | —$OCF_3$ |
| —OXF— | $CF_2$=CH—O— | —OXF | —O—CH=$CF_2$ |
| —A— | H—C≡C— | —A | —C≡C—H |
| -nA— | $C_nH_{2n+1}$—C≡C— | —An | —C≡C—$C_nH_{2n+1}$ |
| —NA— | N≡C—C≡C— | —AN | —C≡C—C≡N |
| Use together with one another and/or with others | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots "..." are placeholders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

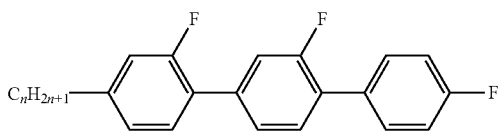

GGP-n-F

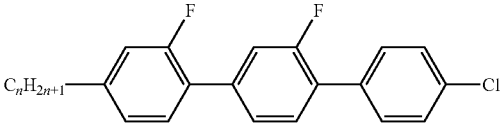

GGP-n-CL

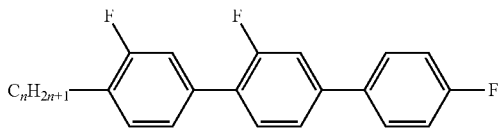

PGIGI-n-F

TABLE D-continued
Illustrative structures
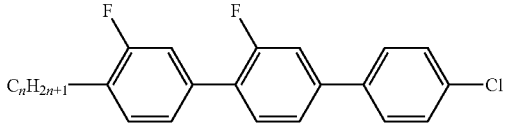
PGIGI-n-CL
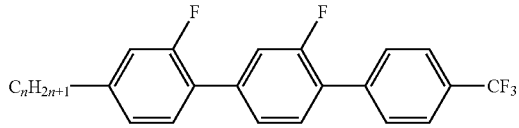
GGP-n-T
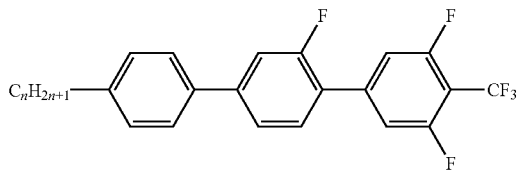
PGU-n-T
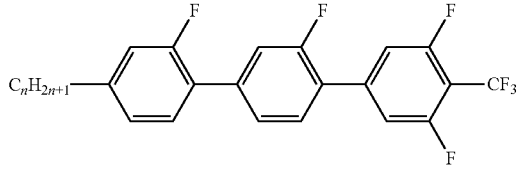
GGU-n-T
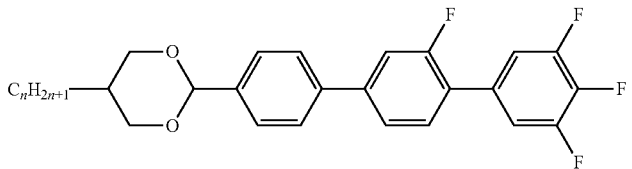
DPGU-n-F
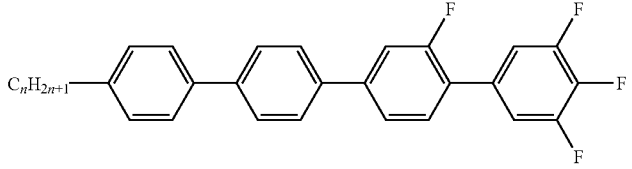
PPGU-n-F
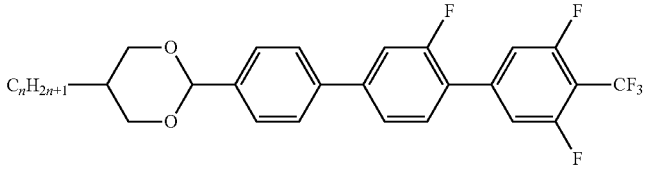
DPGU-n-T TABLE D-continued Illustrative structures PPGU-n-T PUQU-n-N GUQU-n-N GUUQU-n-N GUUQU-n-N GUQU-n-F PUQGU-n-F

TABLE D-continued
Illustrative structures
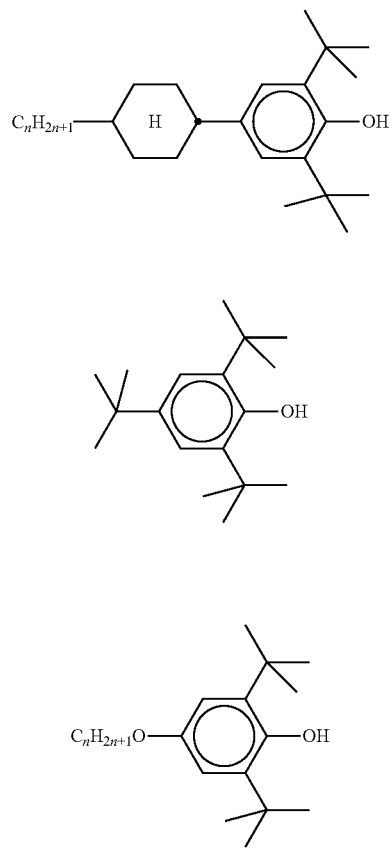
GUQGU-n-F
PUQGU-n-T
GUQGU-n-T
in which n, m and l preferably, independently of one another, denote(s) an integer from 1 to 7, preferably from 2 to 6.
The following table, Table E, shows illustrative compounds which can be used as stabiliser in the mesogenic media according to the present invention.
TABLE E TABLE E-continued
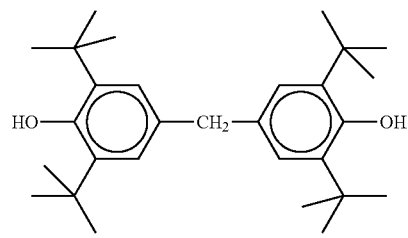
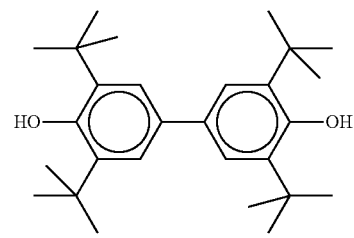
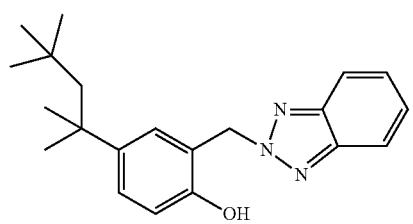 [SMILES: CC(C)(C)CC(C)(C)c1ccc(O)c(Cn2nc3ccccc3n2)c1]
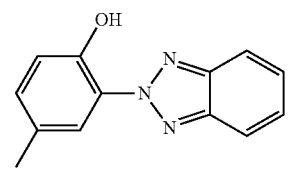 [SMILES: Cc1ccc(O)c(-n2nc3ccccc3n2)c1]
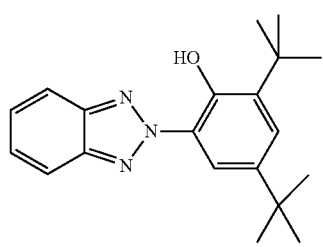 [SMILES: CC(C)(C)c1cc(-n2nc3ccccc3n2)c(O)c(C(C)(C)C)c1]
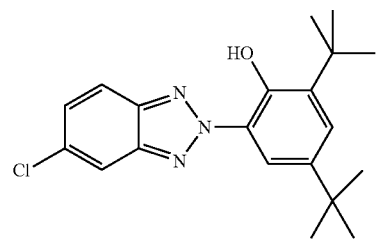 [SMILES: CC(C)(C)c1cc(-n2nc3ccc(Cl)cc3n2)c(O)c(C(C)(C)C)c1]
TABLE E-continued
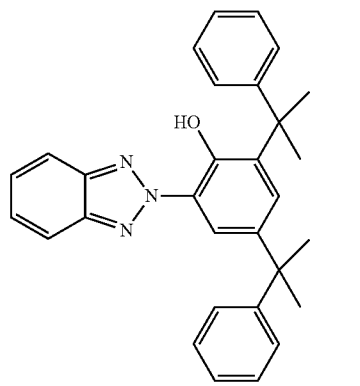 [SMILES: CC(C)(c1ccccc1)c1cc(-n2nc3ccccc3n2)c(O)c(C(C)(C)c2ccccc2)c1]
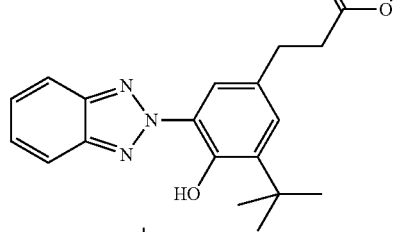
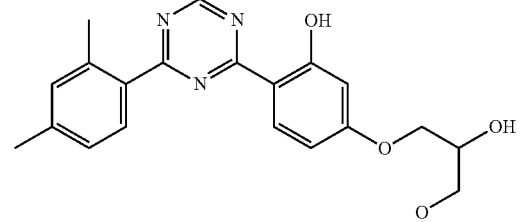

TABLE E-continued
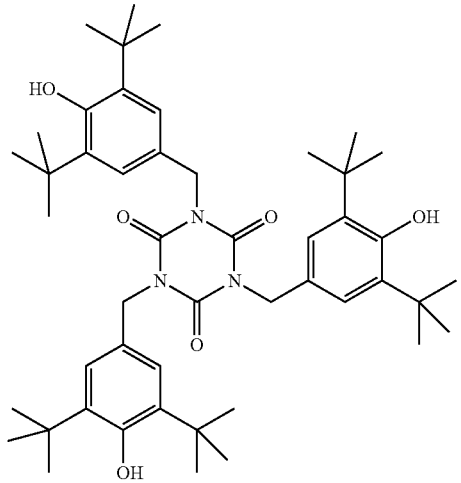 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
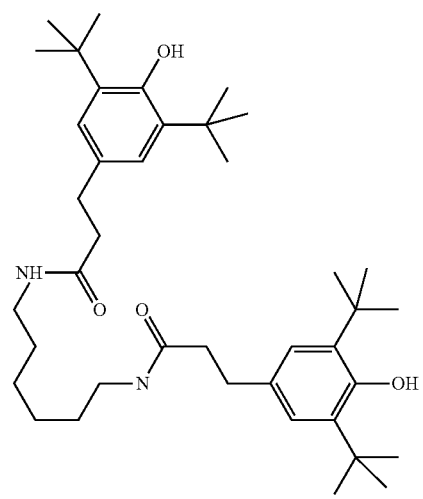 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
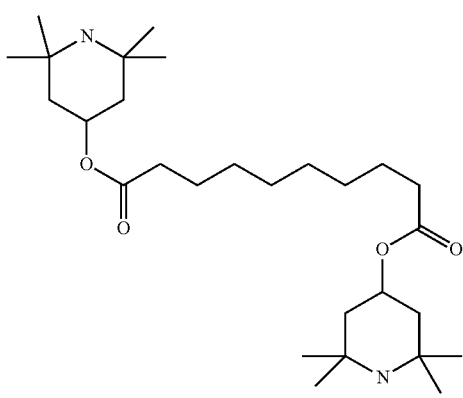
TABLE E-continued
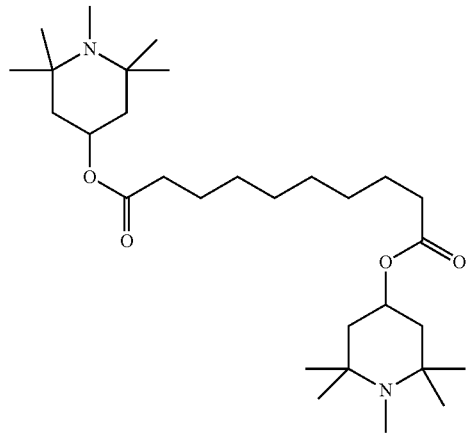
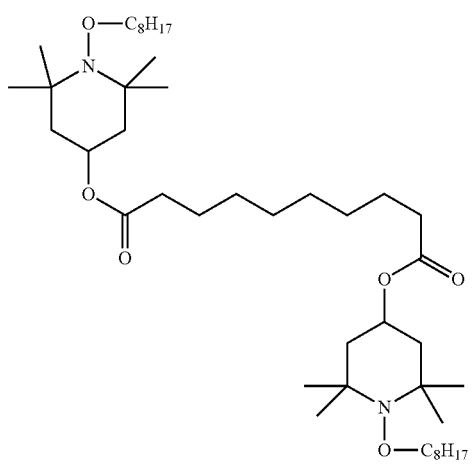
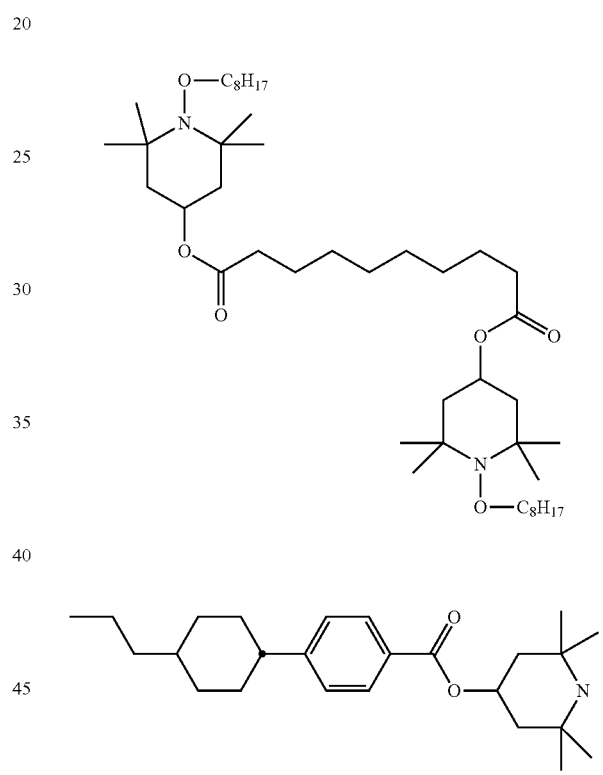
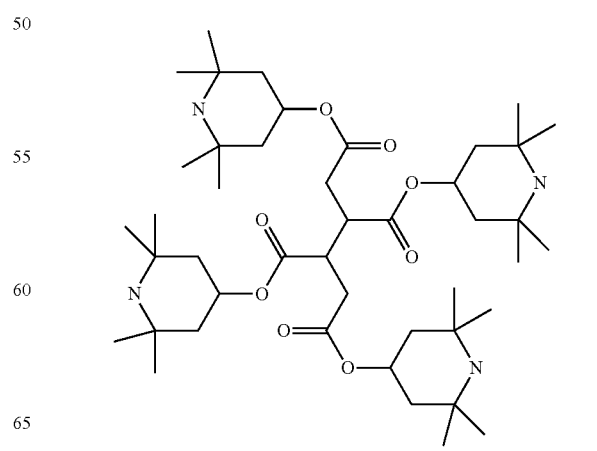

TABLE E-continued
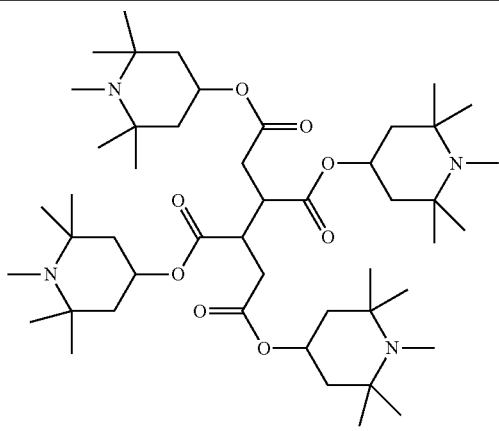
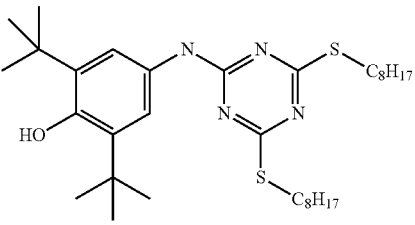
In a preferred embodiment of the present invention, the mesogenic media comprise one or more compounds selected from the group of the compounds from Table E.
The following table, Table F, shows illustrative compounds which can preferably be used as chiral dopants in the mesogenic media according to the present invention.
TABLE F
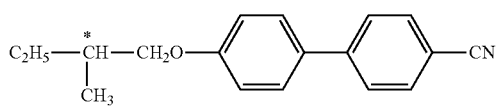
C 15
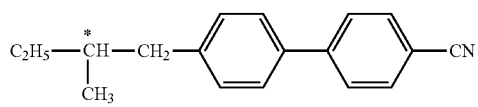
CB 15
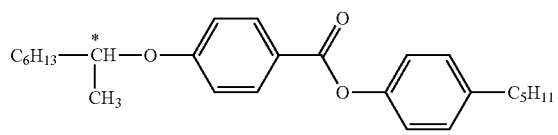
CM 21
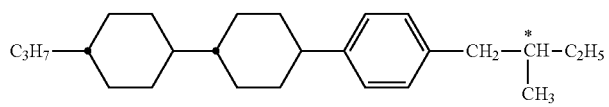
CM 44
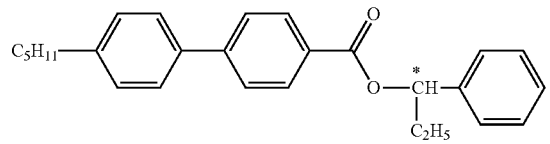
CM 45
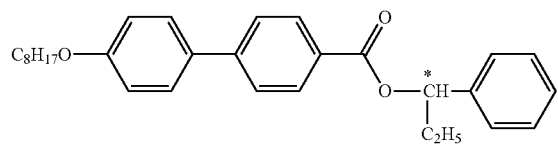
CM 47

TABLE F-continued
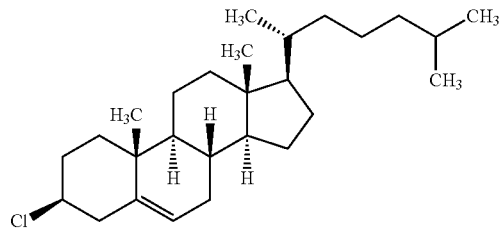
CC
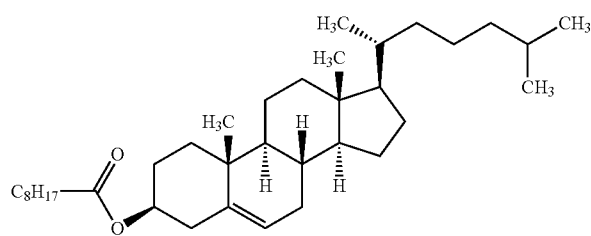
CN
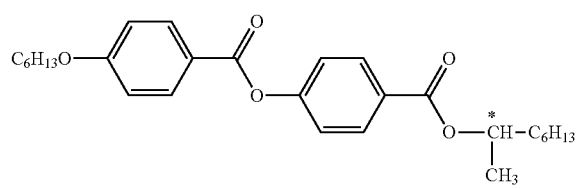
R/S-811
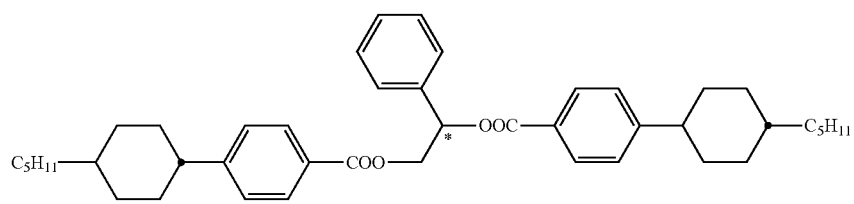
R/S-1011
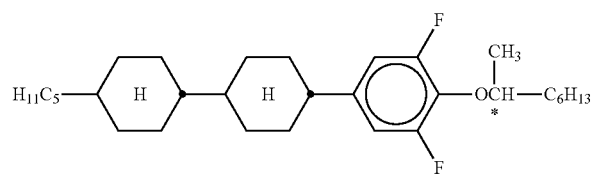
R/S-2011
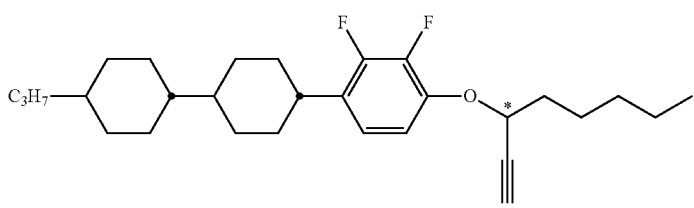
R/S-3011

TABLE F-continued

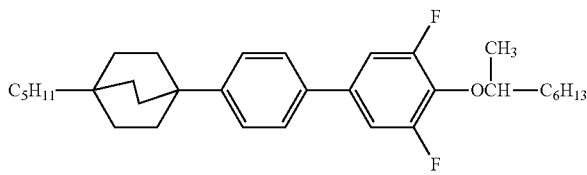

R/S-4011

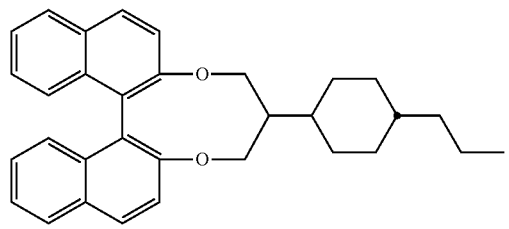

R/S-5011

In a preferred embodiment of the present invention, the mesogenic media comprise one or more compounds selected from the group of the compounds from Table F.

The mesogenic media according to the present invention preferably comprise two or more, preferably four or more, compounds selected from the group consisting of the compounds from the above tables.

The liquid-crystal media according to the present invention preferably comprise seven or more, preferably eight or more, compounds, preferably compounds having three or more, preferably four or more, different formulae, selected from the group of the compounds from Table D.

EXAMPLES

The examples below illustrate the present invention without limiting it in any way.

However, the physical properties show the person skilled in the art what properties can be achieved and in what ranges they can be modified. In particular, the combination of the various properties which can preferably be achieved is thus well defined for the person skilled in the art.

Liquid-crystal mixtures having the composition and properties as indicated in the following tables are prepared and investigated.

The so-called "HTP" denotes the helical twisting power of an optically active or chiral substance in an LC medium (in $\mu m^{-1}$). Unless indicated otherwise, the HTP is measured in the commercially available nematic LC host mixture MLD-6260 (Merck KGaA) at a temperature of 20° C.

Example 1

The following liquid crystalline mixture M-1 is prepared and investigated with respect to its general physical properties. The composition and properties are given in the following table.

Composition and properties liquid crystal mixture M-1

Composition

| No. | Compound Abbreviation | Conc./ mass-% | Physical Properties | |
|---|---|---|---|---|
| 1 | PGU-4-T | 4.0 | T(N, I) = | 71° C. |
| 2 | PGU-5-T | 3.0 | $\Delta n$(20° C., 589 nm) = | 0.1929 |
| 3 | DPGU-4-F | 8.0 | | |
| 4 | GUQU-3-F | 7.0 | $\Delta\varepsilon$(20°, 1 kHz) = | 201.5 |
| 5 | GUQU-4-F | 6.0 | | |
| 6 | GUQGU-3-F | 8.0 | $k_{11}$(20° C.) = | 21.98 pN |
| 7 | GUQGU-4-F | 6.0 | | |
| 8 | GUQGU-5-F | 4.0 | | |
| 9 | GUQGU-2-T | 12.0 | | |
| 10 | GUQGU-3-T | 12.0 | | |
| 11 | GUQGU-4-T | 12.0 | | |
| 12 | GUQGU-5-T | 12.0 | | |
| 13 | GUUQU-3-N | 6.0 | | |
| Σ | | 100.0 | | |

3.8% of the chiral agent R-5011 and 0.2% of Irgacure® 651 are solved in the achiral liquid crystal mixture M-1 and the electro-optical response of resultant mixture in an IPS-type cell is investigated. The mixture is filled into an electro optical test cell with inter-digital electrodes on one substrate side. The electrode width is 10 μm, the distance between adjacent electrodes is 10 μm and the cell gap is also 10 μm. This test cell is evaluated electro-optically between crossed polarisers.

Appropriate Concentrations
a) of the reactive mesogen of the formula RM-C

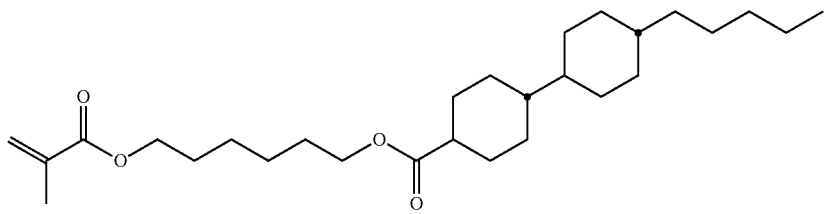

and
c) alternatively of one of the two reactive compounds of the formulae A

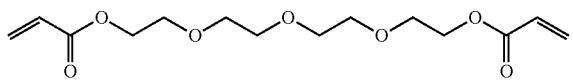 [SMILES: C=CC(=O)OCCOCCOCCOCCOC(=O)C=C]

or RM

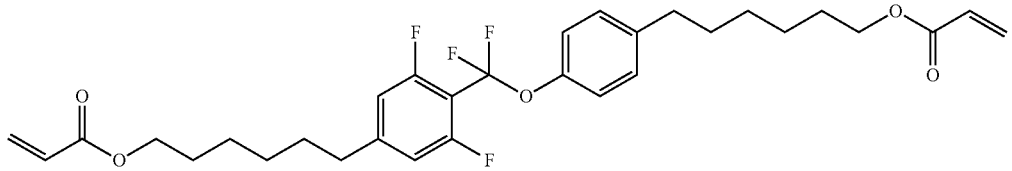 [SMILES: C=CC(=O)OCCCCCCc1ccc(OC(F)(F)c2c(F)cc(CCCCCCOC(=O)C=C)cc2F)cc1]

respectively, are added to the mixture of interest, here mixture M-1.

The resultant mixture is introduced into test cells and heated to an appropriate temperature, at which the mixture is in the blue phase. Then it is exposed to UV.

The mixtures are characterised as described below before the polymerisation. The reactive components are then polymerised in the blue phase by irradiation once (180 s), and the resultant media are recharacterised.

Detailed Description of the Polymerisation

Before the polymerisation of a sample, the phase properties of the medium are established in a test cell having a thickness of about 10 microns and an area of 2×2.5 cm$^2$. The filling is carried out by capillary action at a temperature of 75° C. The measurement is carried out under a polarising microscope with heating stage with a temperature change of 1° C./min.

The polymerisation of the media is carried out by irradiation with a UV lamp (Dymax, Bluewave 200, 365 nm interference filter) having an effective power of about 3.0 mW/cm$^2$ for 180 seconds. The polymerisation is carried out directly in the electro-optical test cell.

The polymerisation is carried out initially at a temperature at which the medium is in the blue phase I (BP-I). The polymerisation is carried out in a plurality of part-steps, which gradually result in complete polymerisation. The temperature range of the blue phase generally changes during the polymerisation. The temperature is therefore adapted between each part-step so that the medium is still in the blue phase. In practice, this can be carried out by observing the sample under the polarising microscope after each irradiation operation of about 5 s or longer. If the sample becomes darker, this indicates a transition into the isotropic phase. The temperature for the next part-step is reduced correspondingly.

The entire irradiation time which results in maximum stabilisation is typically 180 s at the irradiation power indicated. Further polymerisations can be carried out in accordance with an optimised irradiation/temperature programme.

Alternatively, the polymerisation can also be carried out in a single irradiation step, in particular if a broad blue phase is already present before the polymerisation.

Electro-Optical Characterisation

After the above-described polymerisation and stabilisation of the blue phase, the phase width of the blue phase is determined. The electro-optical characterisation is carried out subsequently at various temperatures within and if desired also outside this range.

The test cells used are fitted on one side with interdigital electrodes on the cell surface. The cell gap, the electrode separation and the electrode width are typically each 10 microns. This uniform dimension is referred to below as the gap width. The area covered by electrodes is about 0.4 cm$^2$. The test cells do not have an alignment layer.

For the electro-optical characterisation, the cell is located between crossed polarising filters, where the longitudinal direction of the electrodes adopts an angle of 45° to the axes of the polarising filter. The measurement is carried out using a DMS301 (Autronic-Melchers) at a right angle to the cell plane, or by means of a highly sensitive camera on the polarising microscope. In the voltage-free state, the arrangement described gives an essentially dark image (definition 0% transmission).

Firstly, the characteristic operating voltages and then the response times are measured on the test cell. The operating voltage is applied to the cell electrodes in the form of rectangular voltage having an alternating sign (frequency 100 Hz) and variable amplitude, as described below.

The transmission is measured while the operating voltage is increased. The attainment of the maximum value of the transmission defines the characteristic quantity of the operating voltage $V_{100}$. Equally, the characteristic voltage $V_{10}$ is determined at 10% of the maximum transmission. These values are measured at various temperatures in the range of the blue phase.

Relatively high characteristic operating voltages $V_{100}$ are observed at the upper and lower end of the temperature range of the blue phase. In the region of the minimum operating voltage, $V_{100}$ generally only increases slightly with increasing temperature. This temperature range, limited by $T_1$ and $T_2$, is referred to as the usable, flat temperature range (FR). The width of this "flat range" (FR) is ($T_2$-$T_1$) and is known as the width of the flat range (WFR). The precise values of $T_1$ and $T_2$ are determined by the intersections of tangents on the flat curve section FR and the adjacent steep curve sections in the $V_{100}$/temperature diagram.

In the second part of the measurement, the response times during switching on and off ($\tau_{on}$, $\tau_{off}$) are determined. The response time $\tau_{on}$ is defined by the time to achievement of 90% intensity after application of a voltage at the level of $V_{100}$ at the selected temperature. The response time $\tau_{off}$ is defined by the time until the decrease by 90% starting from maximum intensity at $V_{100}$ after reduction of the voltage to 0 V. The response time is also determined at various temperatures in the range of the blue phase.

As further characterisation, the transmission at continuously increasing and falling operating voltage between 0 V and $V_{100}$ is measured at a temperature within the FR. The difference between the two curves is known as hysteresis. The difference in the transmissions at 0.5·$V_{100}$ and the difference in the voltages at 50% transmission are, for example, characteristic hysteresis values and are known as $\Delta T_{50}$ and $\Delta V_{50}$ respectively.

As a further characteristic quantity, the ratio of the transmission in the voltage-free state before and after passing through a switching cycle can be measured. This transmission ratio is referred to as the "memory effect". The value of the memory effect is 1.0 in the ideal state. Values above 1 mean that a certain memory effect is present in the form of excessively high residual transmission after the cell has been switched on and off. This value is also determined in the working range of the blue phase (FR).

Typical concentrations of the polymer precursors are as follows.

| Mixture<br>Constituent | M-1-1 | M-1-2 |
|---|---|---|
| | Concentration/% | |
| M-1 | 88.0 | 88.0 |
| R-5011 | 3.8 | 3.8 |
| RM-C | 5.0 | 5.0 |
| A | 3.0 | 0.0 |
| RM | 0.0 | 3.0 |
| IRG-651 ® | 0.2 | 0.2 |
| Σ | 100.0 | 100.0 |

The results are summarised in the following table.

| Mixture | M-1-1 | M-1-2 |
|---|---|---|
| Measurement values (20° C.) | | |
| Transition point before the polymerisation | | |
| Polymerisation temperature/° C. | | |
| $V_{100}$ (20° C.)/V | 53 | 58 |
| $V_{10}$ (20° C.)/V | | |
| $V_{90}$ (20° C.)/V | | |
| $\Delta V_{50}$ (20° C.)/V | | |
| Contrast, switching on | | |
| Contrast, switching off | | |
| Memory effect | | |

The polymerisable mixture is polymerised in a single irradiation step at a temperature of about 30-50° C. at the lower end of the temperature range of the blue phase (cf. above for details).

The polymer-stabilised liquid-crystalline media exhibit a blue phase over a broad temperature range.

The polymer-stabilised medium M-1-1, prepared using the monomer of formula A according to the invention, exhibits a reduction in the operating voltage ($V_{op}$) and good contrast on switching on and on switching off compared with conventional media (M-1-2) from the prior art (WO 2012/163470 A1).

It can be seen from this that the monomers according to the invention are particularly suitable for the stabilisation of blue phases, in particular in the case of media having a high concentration of chiral dopant.

The invention claimed is:

1. A mesogenic medium comprising one or more compounds of formula A,

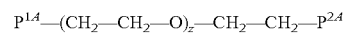

wherein
$P^{1A}$ and $P^{2A}$ each, independently of one another, denote a polymerisable group, and
z denotes an integer between 1 and 12;
and comprising one or more compounds selected from the group consisting of compounds of formulae I and II

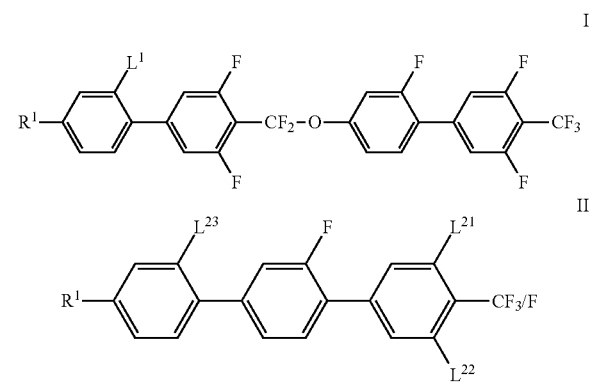

wherein
$L^1$ is H or F,
$L^{21}$ to $L^{23}$ are, independently of each other, H or F,
$R^1$ and $R^2$ are, independently of each other, alkyl, which is straight chain or branched, is unsubstituted, mono- or poly-substituted by F, Cl or CN, and in which one or more $CH_2$ groups are optionally replaced, in each case independently from one another, by —O—, —S—, —$NR^{01}$—, —$SiR^{01}R^{02}$—, —CO—, —COO—, —OCO—, —OCO—O—, —S—CO—, —CO—S—, —$CY^{01}$=$CY^{02}$— or —C≡C— in such a manner that O and/or S atoms are not linked directly to one another,
$Y^{01}$ and $Y^{02}$ are, independently of each other, F, Cl or CN, and alternatively one of them may be H, and $R^{O1}$ and $R^{O2}$ are, independently of each other, H or alkyl with 1 to 12 C-atoms.

2. The medium according to claim 1, further comprising one or more compounds of formula III

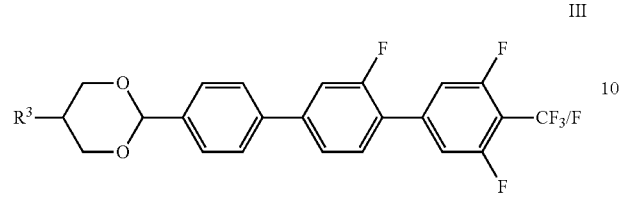

wherein $R^3$ is alkyl, which is straight chain or branched, is unsubstituted, mono- or poly-substituted by F, Cl or CN, and in which one or more $CH_2$ groups are optionally replaced, in each case independently from one another, by —O—, —S—, —$NR^{O1}$—, —$SiR^{O1}R^{O2}$—, —CO—, —COO—, —OCO—, —OCO—O—, —S—CO—, —CO—S—, —$CY^{O1}$=$CY^{O2}$— or —C≡C— in such a manner that O and/or S atoms are not linked directly to one another, $Y^{O1}$ and $Y^{O2}$ are, independently of each other, F, Cl or CN, and alternatively one of them may be H, and $R^{O1}$ and $R^{O2}$ are, independently of each other, H or alkyl with 1 to 12 C-atoms.

3. The medium according to claim 1, further comprising one or more compounds selected from the group consisting of compounds of formulae IV and V

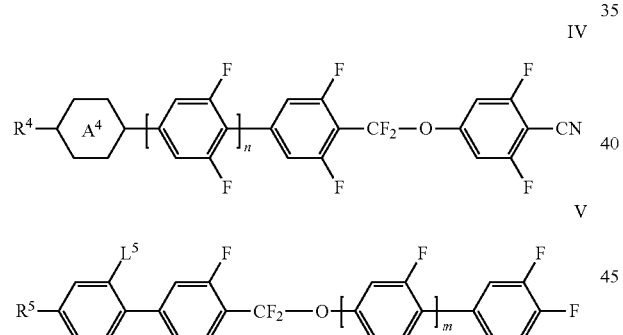

wherein $R^4$ and $R^5$ are, independently of each other, alkyl, which is straight chain or branched, is unsubstituted, mono- or poly-substituted by F, Cl or CN, and in which one or more $CH_2$ groups are optionally replaced, in each case independently from one another, by —O—, —S—, —CO—, —COO—, —OCO—, —OCO—O—, —S—CO—, —CO—S— or —C≡C— in such a manner that O and/or S atoms are not linked directly to one another, $L^5$ is H or F,

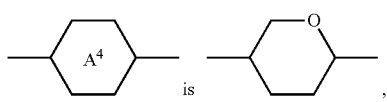

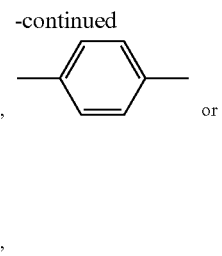

and n and m are, independently of one another, 0 or 1.

4. The medium according to claim 1, comprising one or more compounds of formula I.

5. The medium according to claim 1, comprising one or more compounds of formula II.

6. The medium according to claim 1, which has a blue phase.

7. A method for stabilizing a mesogenic medium, comprising subjecting the medium according to claim 1 to polymerisation of its polymerisable constituents.

8. A light modulation element, comprising a medium according to claim 1.

9. An electro-optical display, comprising a medium according to claim 1.

10. A mesogenic medium comprising one or more compounds of formula A, $$P^{1A}—(CH_2—CH_2—O)_z—CH_2—CH_2—P^{2A} \quad\quad A$$

wherein $P^{1A}$ and $P^{2A}$ each, independently of one another, denote a polymerisable group, and z denotes an integer between 1 and 12;

and comprising one or more compounds of formula III

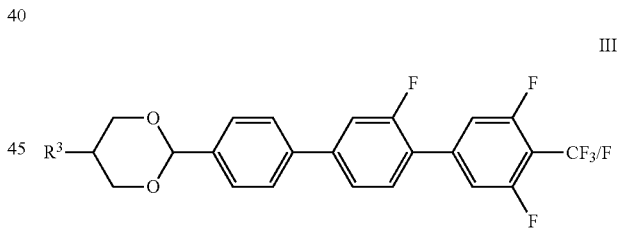

wherein $R^3$ is alkyl, which is straight chain or branched, is unsubstituted, mono- or poly-substituted by F, Cl or CN, and in which one or more $CH_2$ groups are optionally replaced, in each case independently from one another, by —O—, —S—, —$NR^{O1}$—, —$SiR^{O1}R^{O2}$—, —CO—, —COO—, —OCO—, —OCO—O—, —S—CO—, —CO—S—, —$CY^{O1}$=$CY^{O2}$— or —C≡C— in such a manner that O and/or S atoms are not linked directly to one another, $Y^{O1}$ and $Y^{O2}$ are, independently of each other, F, Cl or CN, and alternatively one of them may be H, and $R^{O1}$ and $R^{O2}$ are, independently of each other, H or alkyl with 1 to 12 C-atoms;

or comprising one or more compounds selected from the group consisting of compounds of formulae IV and V

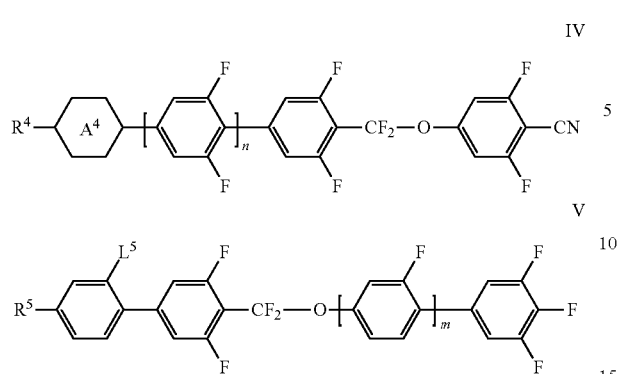

wherein
R⁴ and R⁵ are, independently of each other, alkyl, which is straight chain or branched, is unsubstituted, mono- or poly-substituted by F, Cl or CN, and in which one or more CH₂ groups are optionally replaced, in each case independently from one another, by —O—, —S—, —CO—, —COO—, —OCO—, —OCO—O—, —S—CO—, —CO—S— or —C≡C— in such a manner that O and/or S atoms are not linked directly to one another, L⁵ is H or F,

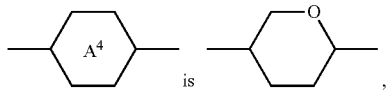

and n and m are, independently of one another, 0 or 1.

11. The medium according to claim 10, comprising one or more compounds of formula III.

12. The medium according to claim 10, comprising one or more compounds of formula IV.

13. The medium according to claim 10, comprising one or more compounds of formula V.

14. The medium according to claim 10, which has a blue phase.

15. A method for stabilizing a mesogenic medium, comprising subjecting the medium according to claim 10 to polymerisation of its polymerisable constituents.

16. A light modulation element, comprising a medium according to claim 10.

17. An electro-optical display, comprising a medium according to claim 10.

* * * * *